US012800942B2

(12) United States Patent
Schowengerdt et al.

(10) Patent No.: US 12,800,942 B2
(45) Date of Patent: Nov. 17, 2026

(54) METHOD AND SYSTEM FOR FIBER SCANNING PROJECTOR WITH ANGLED EYEPIECE

(71) Applicant: Magic Leap, Inc., Plantation, FL (US)

(72) Inventors: Brian T. Schowengerdt, Seattle, WA (US); Mathew D. Watson, Bellevue, WA (US)

(73) Assignee: Magic Leap, Inc., Plantation, FL (US)

( * ) Notice: Subject to any disclaimer, the term of this patent is extended or adjusted under 35 U.S.C. 154(b) by 215 days.

(21) Appl. No.: 18/900,077

(22) Filed: Sep. 27, 2024

(65) Prior Publication Data

US 2025/0020940 A1 Jan. 16, 2025

Related U.S. Application Data

(60) Division of application No. 17/210,236, filed on Mar. 23, 2021, now Pat. No. 12,135,435, which is a (Continued)

(51) Int. Cl.
*G02B 27/42* (2006.01)
*G02B 26/10* (2006.01)
(Continued)

(52) U.S. Cl.
CPC ....... *G02B 27/4233* (2013.01); *G02B 26/103* (2013.01); *G02B 27/0172* (2013.01); (Continued)

(58) Field of Classification Search
CPC .............. G02B 27/4233; G02B 26/103; G02B 27/0172; G02B 27/0179; G02B 27/4205; (Continued)

(56) References Cited

U.S. PATENT DOCUMENTS 4,711,512 A 12/1987 Upatnieks
8,773,599 B2 7/2014 Saeedi et al.
(Continued)

FOREIGN PATENT DOCUMENTS

CN 106133569 A 11/2016
CN 108139593 A 6/2018
(Continued)

OTHER PUBLICATIONS

EP23207072.2, "Intention to Grant", Oct. 6, 2025, 9 pages.
(Continued)

*Primary Examiner* — Stephone B Allen
*Assistant Examiner* — Jennifer A Jones
(74) *Attorney, Agent, or Firm* — KILPATRICK TOWNSEND & STOCKTON LLP

(57) ABSTRACT

A wearable display system includes a fiber scanner including an optical fiber and a scanning mechanism configured to scan a tip of the optical fiber along an emission trajectory defining an optical axis. The wearable display system also includes an eyepiece positioned in front of the tip of the optical fiber and including a planar waveguide, an incoupling diffractive optical element (DOE) coupled to the planar waveguide, and an outcoupling DOE coupled to the planar waveguide. The wearable display system further includes a collimating optical element configured to receive light reflected by the incoupling DOE and collimate and reflect light toward the eyepiece.

17 Claims, 19 Drawing Sheets

Related U.S. Application Data continuation of application No. PCT/US2019/053538, filed on Sep. 27, 2019.

(60) Provisional application No. 62/738,907, filed on Sep. 28, 2018.

(51) Int. Cl.
*G02B 27/01* (2006.01)
*G03B 21/14* (2006.01)

(52) U.S. Cl.
CPC ..... *G02B 27/0179* (2013.01); *G02B 27/4205* (2013.01); *G02B 27/4227* (2013.01); *G03B 21/142* (2013.01)

(58) Field of Classification Search
CPC ............ G02B 27/4227; G02B 27/0103; G02B 6/0015; G02B 6/005; G02B 2027/0178; G02B 2027/0174; G02B 6/0078; G02B 5/1842; G02B 26/105; G02B 27/0081; G02B 6/34; G02B 6/3504; G02B 2006/0098; G03B 21/142
USPC .......................................................... 359/558
See application file for complete search history.

(56) References Cited

U.S. PATENT DOCUMENTS

| | | | | |
|---|---|---|---|---|
| 10,139,630 | B2 | 11/2018 | Yokoyama et al. | |
| 11,106,038 | B2 | 8/2021 | Roggatz | |
| 11,460,628 | B2 | 10/2022 | Schowengerdt et al. | |
| 11,480,797 | B2 | 10/2022 | Song et al. | |
| 12,135,435 | B2 | 11/2024 | Schowengerdt et al. | |
| 2003/0202247 | A1 | 10/2003 | Niv et al. | |
| 2006/0001972 | A1* | 1/2006 | Sato | G02B 5/1857 359/569 |
| 2009/0052047 | A1 | 2/2009 | Amitai | |
| 2010/0079865 | A1 | 4/2010 | Saarikko et al. | |
| 2010/0201953 | A1 | 8/2010 | Freeman et al. | |
| 2013/0100362 | A1* | 4/2013 | Saeedi | G02B 27/017 359/214.1 |
| 2013/0285885 | A1 | 10/2013 | Nowatzyk et al. | |
| 2014/0078591 | A1* | 3/2014 | Mukawa | G02B 5/32 359/630 |
| 2015/0277116 | A1* | 10/2015 | Richards | G02B 27/0103 359/13 |
| 2016/0231568 | A1 | 8/2016 | Saarikko et al. | |
| 2017/0038579 | A1 | 2/2017 | Yeoh et al. | |
| 2017/0153460 | A1 | 6/2017 | Vallius et al. | |
| 2017/0208297 | A1 | 7/2017 | Yeoh et al. | |
| 2018/0120559 | A1 | 5/2018 | Yeoh et al. | |
| 2018/0275396 | A1 | 9/2018 | Schowengerdt et al. | |
| 2020/0400962 | A1 | 12/2020 | Hirano et al. | |
| 2021/0271086 | A1* | 9/2021 | Song | G02B 26/103 |
| 2021/0278587 | A1 | 9/2021 | Schowengerdt et al. | |
| 2021/0278686 | A1 | 9/2021 | Schowengerdt et al. | |

FOREIGN PATENT DOCUMENTS

| | | | |
|---|---|---|---|
| CN | 108474956 | A | 8/2018 |
| CN | 108803022 | A | 11/2018 |
| CN | 108957749 | A | 12/2018 |
| JP | 2001500629 | A | 1/2001 |
| JP | 2005345748 | A | 12/2005 |
| JP | 2014132328 | A | 7/2014 |
| KR | 20170024443 | A | 3/2017 |
| WO | 2015001839 | A1 | 1/2015 |
| WO | 2020069371 | A1 | 4/2020 |
| WO | 2020069400 | A1 | 4/2020 |

OTHER PUBLICATIONS

U.S. Appl. No. 17/210,236, "Non-Final Office Action", Mar. 27, 2024, 19 pages.
U.S. Appl. No. 17/210,236, "Notice of Allowance", Jul. 10, 2024, 12 pages.
U.S. Appl. No. 17/211,276, "Non-Final Office Action", Feb. 17, 2022, 9 pages.
U.S. Appl. No. 17/211,276, "Notice of Allowance", May 27, 2022, 9 pages.
CN201980077402.2, "Office Action", Nov. 3, 2022, 11 pages. [no translation available].
EP19867430.1, "Extended European Search Report", Oct. 15, 2021, 8 pages.
EP19867430.1, "Intention to Grant", Jun. 2, 2023, 9 pages.
EP19867430.1, "Notice of Decision to Grant", Oct. 12, 2023, 3 pages.
EP23207072.2, "Extended European Search Report", May 14, 2024, 10 pages.
EP23207072.2, "Partial European Search Report", Feb. 19, 2024, 11 pages.
JP2023-169624, "Office Action" and English translation, Oct. 22, 2024, 8 pages.
Khayatzadeh et al., "Scanning Fiber Microdisplay: Design, Implementation, and Comparison to MEMS Mirror-based Scanning Displays", Optics Express, vol. 26, No. 5, Mar. 5, 2018, pp. 5576-5590.
Liu et al., "All-Angle Negative Reflection with an Ultrathin Acoustic Gradient Metasurface: Floquet-Bloch Modes Perspective and Experimental Verification", Scientific Reports, vol. 7, Article No. 13852, Oct. 23, 2017, pp. 1-9.
PCT/US2019/053538, "International Preliminary Report on Patentability", Apr. 8, 2021, 7 pages.
PCT/US2019/053538, "International Search Report and Written Opinion", Dec. 19, 2019, 8 pages.
PCT/US2019/053592, "International Preliminary Report on Patentability", Apr. 8, 2021, 9 pages.
PCT/US2019/053592, "International Search Report and Written Opinion", Feb. 10, 2020, 12 pages.
PCT/US2019/053592, "Invitation to Pay Additional Fees and, Where Applicable, Protest Fee", Dec. 13, 2019, 2 pages.
CN202311134792.7, "Office Action and English translation", Apr. 23, 2026, 14 pages.

* cited by examiner

METHOD AND SYSTEM FOR FIBER SCANNING PROJECTOR WITH ANGLED EYEPIECE

CROSS-REFERENCES TO RELATED APPLICATIONS

This application is a divisional of U.S. patent application Ser. No. 17/210,236, filed Mar. 23, 2021, entitled "METHOD AND SYSTEM FOR FIBER SCANNING PROJECTOR WITH ANGLED EYEPIECE," which is a continuation of International Patent Application No. PCT/US2019/053538, filed Sep. 27, 2019, entitled "METHOD AND SYSTEM FOR FIBER SCANNING PROJECTOR WITH ANGLED EYEPIECE," which claims the benefit of and priority to U.S. Provisional Patent Application No. 62/738,907, filed Sep. 28, 2018, entitled "METHOD AND SYSTEM FOR FIBER SCANNING PROJECTOR WITH ANGLED EYEPIECE," the entire disclosures of which are hereby incorporated by reference, for all purposes, as if fully set forth herein.

BACKGROUND OF THE INVENTION

Modern computing and display technologies have facilitated the development of systems for so called "virtual reality" or "augmented reality" experiences, wherein digitally reproduced images or portions thereof are presented to a viewer in a manner wherein they seem to be, or may be perceived as, real. A virtual reality, or "VR," scenario typically involves presentation of digital or virtual image information without transparency to other actual real-world visual input. An augmented reality, or "AR," scenario typically involves presentation of digital or virtual image information as an augmentation to visualization of the actual world around the viewer.

Despite the progress made in these display technologies, there is a need in the art for improved methods and systems related to augmented reality systems, particularly, display systems.

SUMMARY OF THE INVENTION

According to some embodiments, a wearable display system includes a fiber scanner, an eyepiece, and a collimating optical element. The fiber scanner includes an optical fiber and a scanning mechanism. The optical fiber has a distal end. The optical fiber is configured for projection of a light beam from the distal end. An optical axis of the fiber scanner is defined as co-axial with the light beam as projected from the optical fiber when the optical fiber is not deflected. The scanning mechanism is configured to deflect the optical fiber to scan the light beam to produce a scanned light beam that forms an image. The eyepiece includes a planar waveguide and an incoupling diffractive optical element (DOE). The planar waveguide is oriented non-perpendicular to the optical axis of the fiber scanner. The incoupling DOE is coupled to the waveguide. The incoupling DOE is configured to diffract the scanned light beam incident on the incoupling DOE on a first pass to produce a first pass first diffracted light beam that fails total internal reflection (TIR) condition of the waveguide. The collimating optical element is configured to reflect a portion of the scanned light beam that passes through the incoupling DOE on the first pass to produce a reflected portion of the scanned light beam incident on the incoupling DOE on a second pass. The incoupling DOE is configured to diffract the reflected portion of the scanned light beam on the second pass to produce a second pass first diffracted light beam that meets the TIR condition of the waveguide.

In an embodiment, the fiber scanner is positioned on a first side of the eyepiece and the collimating optical element is positioned on a second side of the eyepiece opposite from the first side. The first pass first diffracted light beam can include a negative first order diffraction and the second pass first diffracted light beam can include a positive first order diffraction. In an implementation, the incoupling DOE is metallized and the fiber scanner and the collimating optical element are positioned on a same side of the eyepiece. In another embodiment, the first pass first diffracted light beam includes a positive first order diffraction and the second pass first diffracted light beam includes a negative first order diffraction. The wearable display system can also include a mirror positioned along the optical axis of the fiber scanner on a first side of the eyepiece. The fiber scanner and the collimating optical element can be positioned on a second side of the eyepiece opposite from the first side and the mirror is spaced apart from the incoupling DOE. The scanned light beam can be imagewise modulated. In an embodiment, the optical fiber is not configured to maintain polarization and the scanned light beam is unpolarized.

According to some embodiments, a wearable display system includes a fiber scanner, a scanning mechanism, an eyepiece, and a collimating optical element. The fiber scanner includes an optical fiber and a scanning mechanism. The optical fiber has a distal end. The optical fiber is configured for projection a light beam from the distal end. An optical axis of the fiber scanner is defined as co-axial with the light beam as projected from the optical fiber when the optical fiber is not deflected. The scanning mechanism is configured to deflect the optical fiber to scan the light beam to produce a scanned light beam that forms an image. The eye piece includes a planar waveguide, an incoupling DOE, and an outcoupling DOE. The planar waveguide is oriented non-perpendicular to the optical axis of the fiber scanner. The incoupling DOE is coupled to the waveguide. The incoupling DOE includes a metallized back surface configured to reflect a first portion of the scanned light beam. The outcoupling DOE is coupled to the waveguide. The outcoupling DOE is configured to direct a portion of the scanned light beam propagating in the waveguide out of the waveguide toward an eye of a viewer. The collimating optical element is configured to reflect the first portion of the scanned light beam reflected by the incoupling DOE back toward the incoupling DOE. The incoupling DOE is further configured to direct a first fraction of the first portion of the scanned light beam reflected by the collimating optical element into the planar waveguide for propagation through the planar waveguide to the outcoupling DOE for redirection by the outcoupling DOE toward the eye of the viewer.

In some embodiments, the first portion of the scanned light beam is reflected by the incoupling DOE as a zeroth order reflection. The first fraction of the first portion of the scanned light beam is diffracted by the incoupling DOE as a negative first order diffraction.

According to some embodiments, a method of displaying an image to a viewer includes operating a fiber scanning projector to produce a scanned light beam that forms an image. The scanned light beam propagates from the fiber scanning projector onto an incoupling diffractive optical element (DOE) coupled to a waveguide. A first portion of the scanned light beam passes through the incoupling DOE. The first portion of the scanned light beam propagates from the incoupling DOE to a reflective optical element. The first portion of the scanned light beam is reflected by the reflective optical element to produce a reflected first portion of the scanned light beam. The reflected first portion of the scanned light beam propagates from the reflective optical element onto the incoupling DOE. The reflected first portion of the scanned light beam is diffracted by the incoupling DOE to produce a second pass first diffracted light beam. The second pass first diffracted light beam propagates within the planar waveguide via total internal reflection (TIR) from the incoupling DOE to an outcoupling DOE coupled with the waveguide. The second pass first diffracted light beam is diffracted by the outcoupling DOE to direct a portion of the second pass first diffracted light beam toward an eye of a viewer to display the image to the user.

In an embodiment, the incoupling DOE diffracts the scanned light beam to form and direct a first pass first diffracted light beam into the waveguide that fails to propagate within the waveguide via TIR. The first pass first diffracted light beam can result from a negative first order diffraction. Moreover, the incoupling DOE can diffract the scanned light beam to form and direct a first pass second diffracted light beam into the waveguide that propagates within the waveguide via TIR. The first pass second diffracted light beam can result from a positive first order diffraction. The second pass first diffracted light beam can result from a positive first order diffraction.

In an embodiment, the incoupling DOE diffracts the reflected first portion of the scanned light beam to form and direct a second pass second diffracted light beam into the waveguide that fails to propagate within the waveguide via TIR. The second pass second diffracted light beam can result from a negative first order diffraction. The reflective optical element can be configured so that the reflected first portion of the scanned light beam is collimated.

According to some embodiments, a method of displaying an image to a viewer includes operating a fiber scanning projector to produce a scanned light beam that forms an image. The scanned light beam propagates from the fiber scanning projector onto an incoupling diffractive optical element (DOE) coupled to a waveguide. A first portion of the scanned light beam is reflected via a reflective back surface of the incoupling DOE to produce a reflected first portion of the scanned light beam. The reflected first portion of the scanned light beam propagates from the incoupling DOE to a reflective optical element. The reflected first portion of the scanned light beam is reflected by the reflective optical element to produce a second reflected first portion of the scanned light beam. The second reflected first portion of the scanned light beam propagates from the reflective optical element onto the incoupling DOE. The second reflected first portion of the scanned light beam is diffracted by the incoupling DOE to produce a second pass first diffracted light beam. The second pass first diffracted light beam propagates within the planar waveguide via total internal reflection (TIR) from the incoupling DOE to an outcoupling DOE coupled with the waveguide. The second pass first diffracted light beam is diffracted by the outcoupling DOE to direct a portion of the second pass first diffracted light beam toward an eye of a viewer to display the image to the viewer.

In an embodiment, the incoupling DOE diffracts the scanned light beam to form and direct a first pass first diffracted light beam into the waveguide that fails to propagate within the waveguide via TIR. The first pass first diffracted light beam can include a positive first order diffraction. In an embodiment, the incoupling DOE diffracts the scanned light beam to form and direct a first pass second diffracted light beam into the waveguide that propagates within the waveguide via TIR. The first pass second diffracted light beam can include a negative first order diffraction. The second pass first diffracted light beam can include a negative first order diffraction. In an embodiment, the incoupling DOE diffracts the second reflected first portion of the scanned light beam to form and direct a second pass second diffracted light beam into the waveguide that fails to propagate within the waveguide via TIR. The second pass second diffracted light beam can include a positive first order diffraction.

According to some embodiments, a method of displaying an image to a viewer includes operating a first fiber scanning projector to produce a first scanned light beam that forms a first portion of an image. A portion of the first scanned light beam is directed into a waveguide via a first incoupling diffractive optical element (DOE) coupled to a waveguide. The portion of the first scanned light beam propagates within the planar waveguide via total internal reflection (TIR) from the first incoupling DOE to an outcoupling DOE coupled with the waveguide. The portion of the first scanned light beam is diffracted by the outcoupling DOE to direct the portion of the first scanned light beam toward an eye of a viewer to display the first portion of the image to the user. A second fiber scanning projector is operated to produce a second scanned light beam that forms a second portion of an image. A portion of the second scanned light beam is directed into the waveguide via a second incoupling DOE coupled to a waveguide. The portion of the second scanned light beam propagates within the planar waveguide via total internal reflection (TIR) from the second incoupling DOE to the outcoupling DOE. The portion of the second scanned light beam is diffracted by the outcoupling DOE to direct the portion of the second scanned light beam toward the eye of a viewer to display the second portion of the image to the user.

According to some embodiments, a wearable display system includes a fiber scanner. The fiber scanner includes an optical fiber, and a scanning mechanism configured to scan a tip of the optical fiber along an emission trajectory. The emission trajectory may define an optical axis. The wearable display system further includes a collimating optical element positioned along the optical axis, and configured to receive a divergent input light beam emitted from the tip of the optical fiber incident thereon in an on-axis configuration, and produce a collimated light beam. The wearable display system further includes an eyepiece positioned in front of the tip of the optical fiber. The eyepiece includes a planar waveguide oriented such that a normal of the waveguide is tilted at a first angle with respect to the optical axis. The eyepiece further includes an incoupling diffractive optical element (DOE) coupled to a first lateral region of the waveguide that is intercepted by the optical axis. The incoupling DOE may be configured to, as the divergent input light beam emitted from the tip of the optical fiber is incident on the incoupling DOE on a first pass, produce a first negative first order diffracted light beam that fails total internal reflection (TIR) condition of the waveguide; and as the collimated light beam produced by the collimating optical element is incident on the incoupling DOE on a second pass, produce a second negative first order diffracted light beam that meets the TIR condition of the waveguide.

According to some embodiments, a wearable display system includes a fiber scanner. The fiber scanner includes an optical fiber, and a scanning mechanism configured to scan a tip of the optical fiber along an emission trajectory. The emission trajectory may define an optical axis. The wearable display system further includes an eyepiece positioned in front of the tip of the optical fiber. The eyepiece includes a planar waveguide. The waveguide has a first surface facing the tip of the optical fiber, and a second surface opposite the first surface. The waveguide is oriented such that a normal of the waveguide is tilted at a first angle with respect to the optical axis. The eyepiece further includes an incoupling diffractive optical element (DOE) coupled to the second surface of the waveguide in a first lateral region that is intercepted by the optical axis. The incoupling DOE includes a metallized back surface and is configured to reflect a first portion of the input light beam. The eyepiece further includes an outcoupling DOE coupled to a second lateral region of the waveguide. The outcoupling DOE is configured to diffract a portion of light propagating in the waveguide out of the waveguide toward an eye of a viewer. The wearable display system further includes a collimating optical element configured to receive the first portion of the input light beam reflected by the incoupling DOE, and collimate and reflect the first portion of the input light beam toward the eyepiece. The incoupling DOE is further configured to diffract a first fraction of the first portion of the input light beam.

DETAILED DESCRIPTION OF THE SPECIFIC EMBODIMENTS

Methods and systems described herein relate generally to projection display systems that include a wearable display. More particularly, in some embodiments described herein, methods and systems for volumetric displays, also referred to as a light field displays, are provided that create volumetric sculptures of light at more than one depth plane. Embodiments described herein are applicable to a variety of applications in computer vision and image display systems.

Figure 1A:
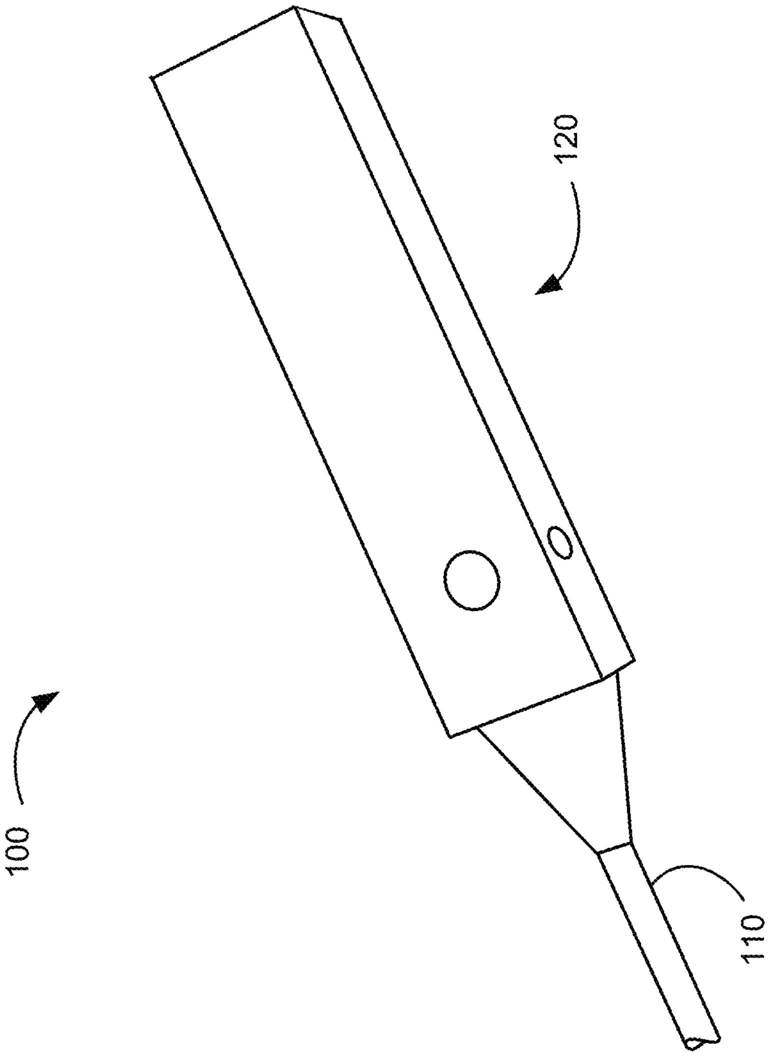
FIG. 1A is a simplified perspective view illustrating a fiber scanner according to an embodiment.

FIG. 1A is a simplified perspective view illustrating a fiber scanner according to an embodiment. The fiber scanner 100, which can have dimensions on the order of 2 mm×2 mm×7 mm, includes a fiber input 110, and a fiber oscillation region 120. Driven by piezoelectric actuators (not illustrated), an optical fiber oscillates in the fiber oscillation region 120, for example, in a spiral configuration with an increasing angular deflection during the projection of light for a given frame time. The various elements of the fiber scanner are described more fully throughout the present specification.

Figure 1B:
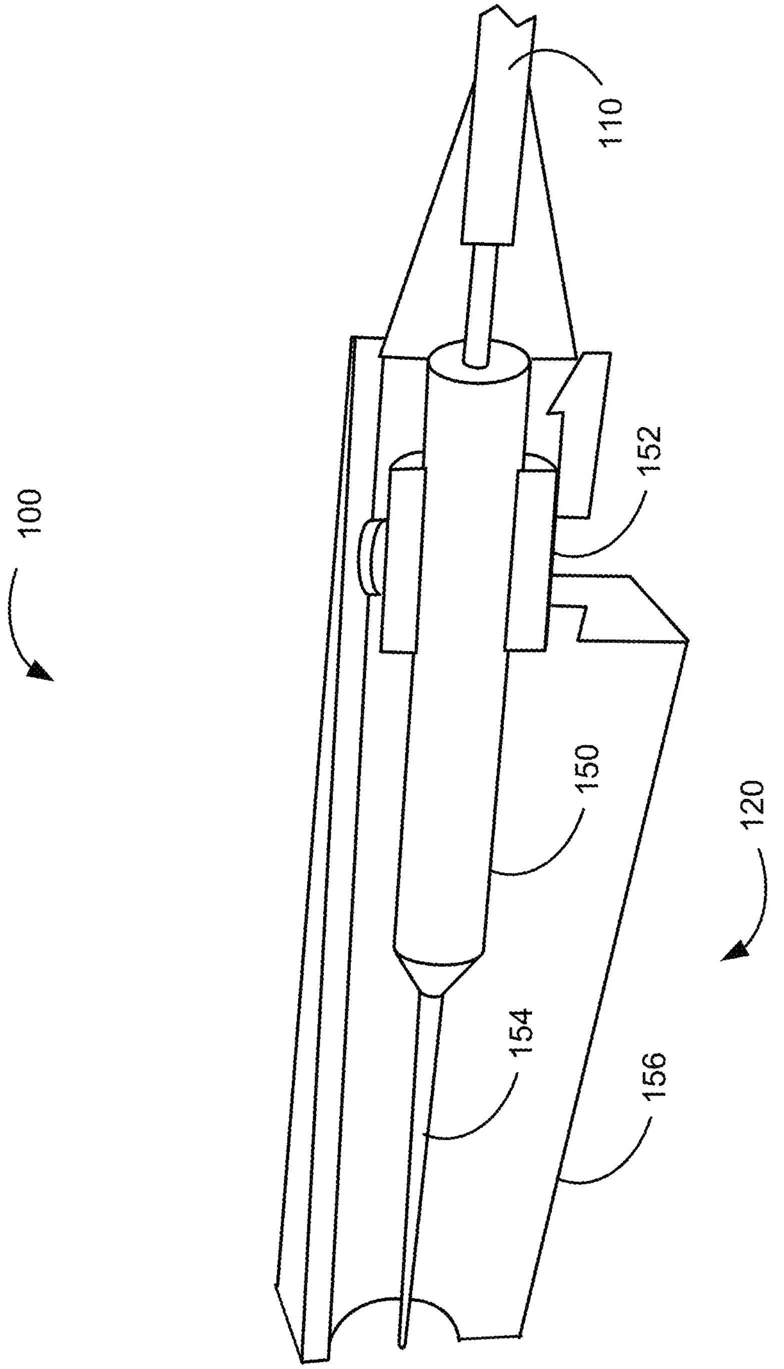
FIG. 1B is a simplified cutaway perspective view illustrating a fiber scanner according to an embodiment.

FIG. 1B is a simplified cutaway perspective view illustrating a fiber scanner according to an embodiment. In the view illustrated in FIG. 1B, the fiber scanner 100 has been rotated horizontally. The fiber input 110 is illustrated on the right hand side of the figure, providing an input to the fiber oscillation section 120, which includes a piezoelectric actuator 150 supported by a retaining collar 152 (and driven by electric signals from wires that are not shown), and a scanning fiber 154 is disposed in a mechanical enclosure 156.

During operation, the scanning fiber 154, which is mechanically attached to the piezoelectric actuator 150, oscillates in the fiber oscillation region 120. In an embodiment, the piezoelectric actuator 150 includes four electrodes distributed at circumferential positions that are shifted 90° with respect to each other. Accordingly, positive and negative voltages applied to opposing sides of the piezoelectric actuator can flex the actuator, and the scanning fiber, in the plane of the electrodes. By driving all four electrodes in synchronization, oscillation of the fiber can be accomplished.

As described more fully herein, small form factors comparable to standard eyeglasses are enabled by embodiments. By utilizing embodiments, displays with a desired field of view, depth of resolution, integrated inertial measurement units (IMUs), cameras, audio components, and the like are provided. In some embodiments, the fiber scanner 100 illustrated in FIGS. 1A and 1B is mounted in the temple or frame of the eyeglasses and works in combination with an eyepiece disposed in the frame to direct the projected light toward the eye of the user. The size of the fiber scanner 100 enables the integration of multiple fiber scanners that can direct light toward each eye, increasing the field of view through tiling of the display areas. As an example, if two projectors are used per eye, a diagonal field of view of 89° can be provided using two projectors. Using four projectors per eye, a diagonal field of view of 134° can be achieved. Additionally, in addition to increases in the field of view, additional depth planes can be provided through the use of multiple projectors. Additional description related to tiling of display areas and the use of multiple projectors to increase the field of view is provided in U.S. patent application Ser. No. 15/927,821, filed on Mar. 21, 2018, the disclosure of which is hereby incorporated by reference in its entirety for all purposes.

In an embodiment, the fiber scanner 100 is fed by fiber input 110 and the fiber oscillation region 120 is mounted in the outside edge of the frame as illustrated in FIG. 2 of U.S. patent application Ser. No. 15/927,855, filed on Mar. 21, 2018, the disclosure of which is hereby incorporated by reference in its entirety for all purposes. Additional descriptions of a fiber scanner are provided in U.S. patent application Ser. No. 15/927,765, filed on Mar. 21, 2018, the disclosure of which is hereby incorporated by reference in its entirety for all purposes.

Figure 2A:
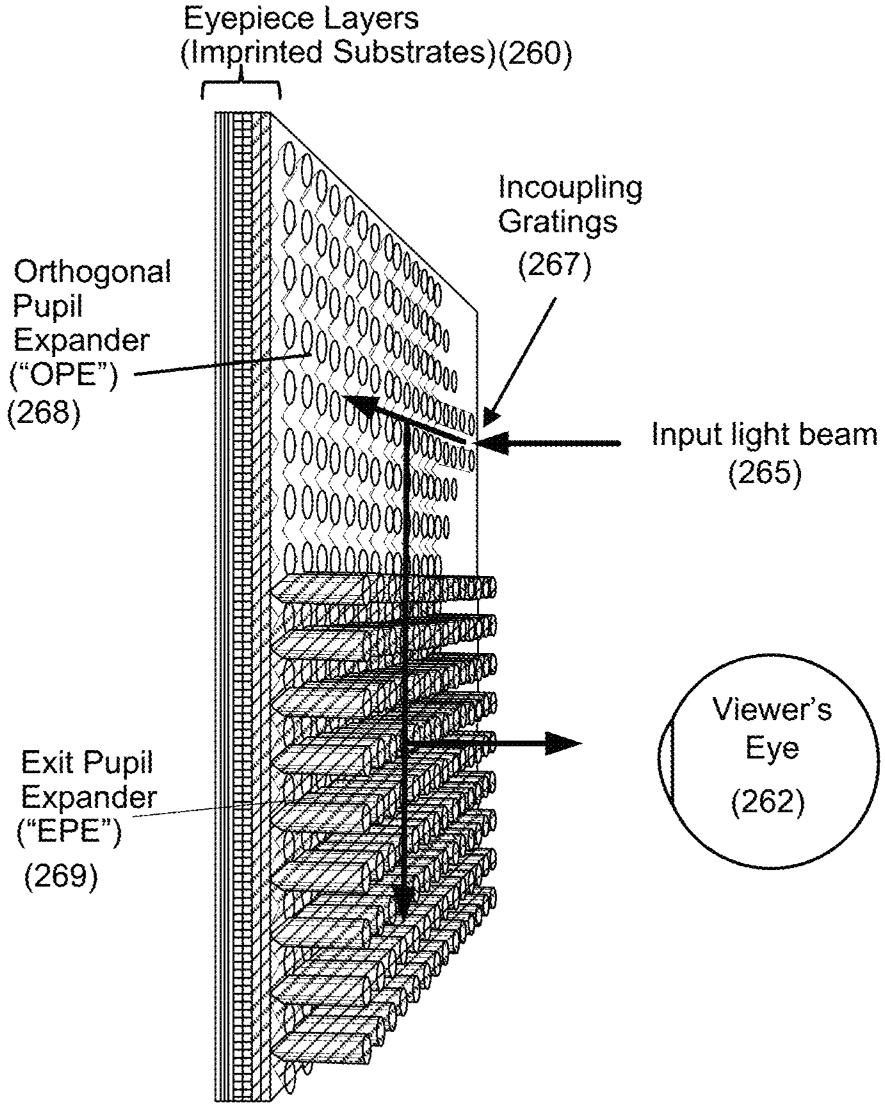
FIG. 2A illustrates schematically the light paths in a viewing optics assembly (VOA) that may be used to present a digital or virtual image to a viewer, according to an embodiment.

FIG. 2A illustrates schematically the light paths in a viewing optics assembly (VOA) that may be used to present a digital or virtual image to a viewer, according to an embodiment. The VOA includes an eyepiece 260 that may be worn around or in front of a viewer's eye. As discussed, herein the VOA can be integrated with the frames of a pair of glasses to present the digital or virtual image to a viewer wearing these glasses. The eyepiece 260 may include one or more eyepiece layers. In one embodiment, the eyepiece 260 includes three eyepiece layers, one eyepiece layer for each of the three primary colors, red, green, and blue. In another embodiment, the eyepiece 260 may include six eyepiece layers, i.e., one set of eyepiece layers for each of the three primary colors configured to form a virtual image at one depth plane, and another set of eyepiece layers for each of the three primary colors configured to form a virtual image at another depth plane. In other embodiments, the eyepiece 260 may include three or more eyepiece layers for each of the three primary colors for three or more different depth planes. Each eyepiece layer comprises a planar waveguide and may include an incoupling grating 267, an orthogonal pupil expander (OPE) region 268, and an exit pupil expander (EPE) region 269.

Still referring to FIG. 2A, an input light beam 265 (e.g., provided by a fiber scanner 100 as illustrated in FIGS. 1A and 1B) projects image light onto the incoupling grating 265 in an eyepiece layer 260. The incoupling grating 267 couples the image light provided by the input light beam 265 into the planar waveguide propagating in a direction toward the OPE region 268. The waveguide propagates the image light in the horizontal direction by total internal reflection (TIR). The OPE region 268 of the eyepiece layer 260 also includes a diffractive element that couples and redirects a portion of the image light propagating in the waveguide toward the EPE region 269. The EPE region 269 includes a diffractive element that couples and directs a portion of the image light propagating in the waveguide in a direction approximately perpendicular to the plane of the eyepiece layer 260 toward a viewer's eye 262. In this fashion, an image projected by the input light beam 265 may be viewed by the viewer's eye 262.

As described above, image light generated by a projector may include light in the three primary colors, namely blue (B), green (G), and red (R). Such image light can be separated into the constituent colors, for example, temporally or spatially, so that image light in each constituent color may be coupled to a respective waveguide in the eyepiece.

Figure 2B:
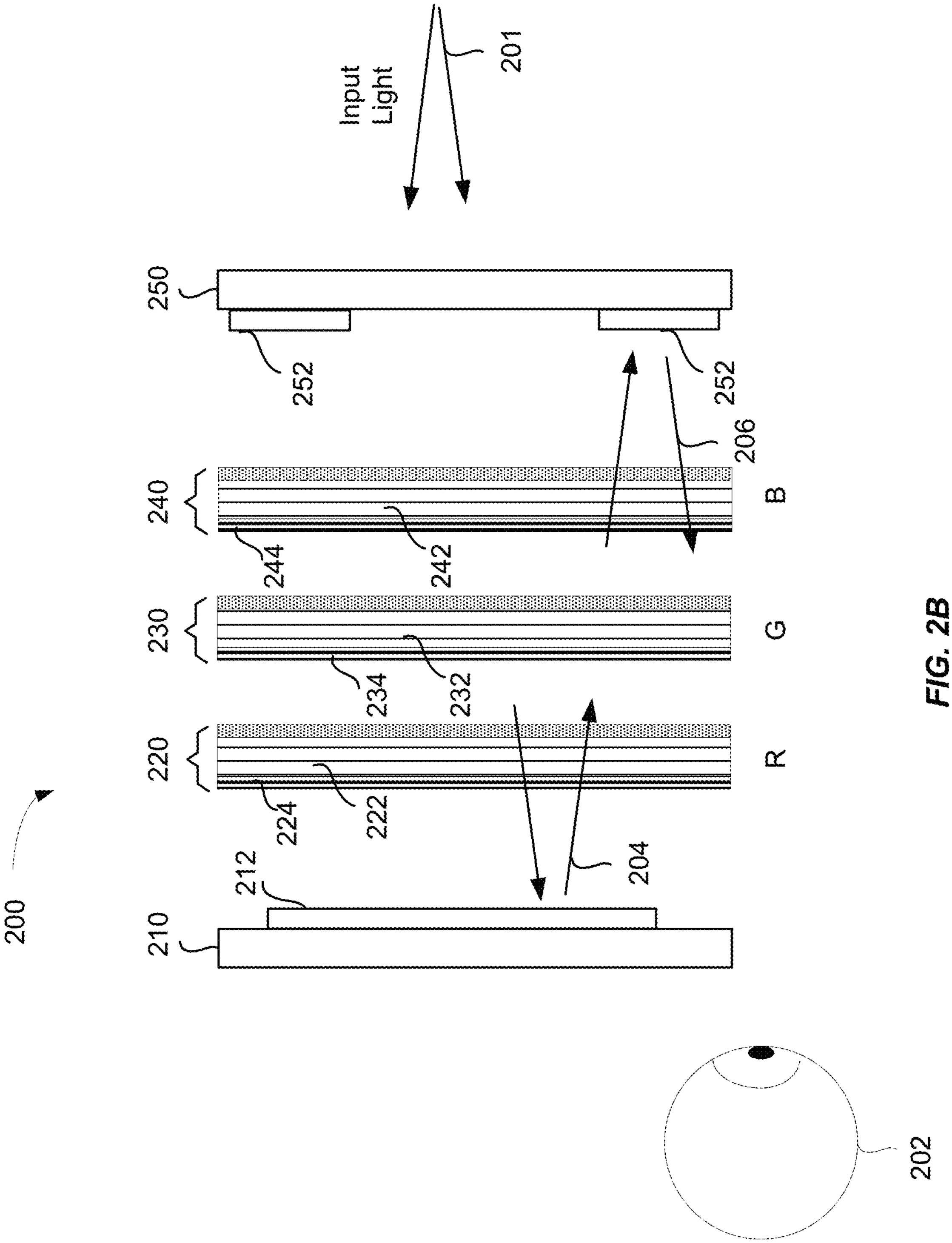
FIG. 2B is a partial cross-sectional view illustrating a structure of an eyepiece according to an embodiment.

FIG. 2B is a partial cross-sectional view illustrating a structure of an eyepiece according to an embodiment. The region shown in the cross-sectional view includes the region of the incoupling diffractive optical element (e.g., incoupling grating) of the eyepiece 200. As shown in FIG. 2B, the eyepiece 200 includes a stack of waveguide plates 220, 230, and 240 that receive input light from the fiber scanner and output image information to the eye 202 of a viewer. The eyepiece 200 illustrated in FIG. 2B includes an eye-side cover layer 210 positioned on the side of the eyepiece adjacent the viewer's eye, and a world-side cover layer 250 positioned on the side of the eyepiece facing toward the world.

In some embodiments, the waveguide plates 220, 230, and 240 include respective planar waveguides 222, 232, or 242, for propagating light in the planes of their respective waveguide plates 220, 230, and 240. Each planar waveguide 222, 232, or 242 has a back surface facing the viewer's eye, and a front surface facing the world. In the embodiment illustrated in FIG. 2B, the waveguide plates 220, 230, and 240 also include respective gratings 224, 234, or 244 disposed on the back surfaces of their respective waveguides 222, 232, or 242, for coupling and redirecting a portion of the light propagating in their respective waveguides 222, 232, or 242.

In the illustrated embodiment, each waveguide 222, 232, or 242, as well as each grating 224, 234, or 244, may be wavelength selective, such that it selectively propagates or redirects light in a given wavelength range. In some embodiments, each of the waveguide plates 220, 230, and 240 may be configured for a respective primary color. For example, the waveguide plate 220 is configured for red (R) light, the waveguide plate 230 is configured for green (G) light, and the waveguide plate 240 is configured for blue (B) light. It will be appreciated that the eyepiece 200 may include two or more waveguide plates for red light, two or more waveguide plates for green light, and two or more waveguide plates for blue light, for different depth planes, as described above. In some other embodiments, other colors, including magenta and cyan, may be used in addition to or may replace one or more of red, green, or blue.

In order to improve the optical efficiency, some embodiments utilize a reflective surface, for example, metallization of the surface, on one of the surfaces, for example, the front surface, of the eye-side cover layer to provide a highly reflective surface (e.g., ~100% reflective coating) that forms a reflective structure behind the input coupling elements (e.g., vertically aligned incoupling gratings) to reflect the input light, which can be RGB light, that passes through the input coupling elements and produce a second pass through the input coupling elements to improve the image brightness. As illustrated in FIG. 2B, reflector 212 reflects input light 201 incident from the fiber scanner that is not coupled into the waveguides. After reflection from reflector 212, the input light is able to make a second pass through the input coupling elements and increase the amount of light coupled into the waveguides.

In an alternative embodiment, an annular reflector 252, for example, fabricated using 100% reflective metal coatings, can be placed on the world-side cover glass. Although this annular reflector 252 is shown on the back side of the world-side cover layer 250, this is not required and it may alternatively be mounted on the front side. One of ordinary skill in the art would recognize many variations, modifications, and alternatives. In this alternative embodiment, the input light 201 from the fiber scanner passes through the center of the annular reflector 252 after it is output from the optical assembly section of the fiber scanner. Since the input light is diverging, the beam spreads as it passes through the eyepiece and reflects from the reflector 212 behind the input coupling elements. This reflected light 204 propagates back through the eyepiece, with the cone of light expanding during propagation. In some embodiments, reflected light 204 is also coupled into the incoupling gratings during the return path, being characterized by the same orientation as the input beams for display to the viewer since, although reflected light 204 is the mirror image of input light 201, entry through the opposing side of the incoupling grating results in the same orientation. A substantial portion, which can be the majority, of the light, reflects from the annular reflector 252 on the world-side cover layer as illustrated by doubly reflected light 206 and is able to make a third pass through the input coupling elements, resulting in additional coupling of light into the waveguide plates. As will be evident to one of skill in the art, a Hall of Mirrors effect can be achieved that results in increased brightness correlated with the increased number of rays passing through the eyepiece, improving the fill factor and image quality.

A channel can be cut in the temple and the frames to accommodate the fiber and electrical wiring. As the fiber/wires pass over the spring hinge, the design dimensions enable the fiber to not be bent past is minimum bend radius of curvature as the temples are folded.

In addition to reflective structures associated with the input coupling elements discussed in relation to FIG. 2B, some embodiments utilize a partially reflective (e.g., 50% aluminized) surface on the inside surface of world-side cover glass so that a portion (e.g., half) of the light that is propagating toward the world from the eyepiece is reflected and directed back toward the eye of the user, which increases the overall brightness and increases the beam density as a result of the slight lateral offset to the beams, which contributes to an improved fill factor.

Embodiments provide improvements over conventional optical configurations. For example, as described U.S. patent application Ser. No. 15/927,765, a polarizing beam splitter may be utilized as a component of a collimating optical assembly for collimating an input light beam emitted from an optical fiber. However, it may be difficult to produce a polarizing beam splitter that performs well for a wide range of incidence angles. In addition, it may be desirable to have high optical throughput through the polarizing beam splitter, which requires high transmission on the first pass and high reflection on the second pass. For a non-polarized input light beam, about fifty percent of the light intensity may be lost on the first pass, and another twenty five percent of the light intensity may be lost on the second pass. To improve the light throughput, it may be desirable to use a polarization-maintaining (PM) optical fiber to deliver a polarized input light beam. Some PM optical fibers have stress members to introduce birefringence to facilitate the polarization-maintaining property. Depending on the etchants used to fabricate the fiber scanner components, the stress members may etch more rapidly or more slowly than the fiber core, resulting in challenges associated with the use of PM optical fibers. Accordingly, some embodiments utilize optical waveguides, including optical fibers, that are not polarization maintaining, thereby reducing system complexity and cost.

Moreover, embodiments provide optical configurations that utilize a collimating optical element in an on-axis configuration. As will be evident to one of skill in the art, it may be desirable to use optical elements in an on-axis configuration in which light is incident on the optical elements at angles that are generally normal to the surface of the optical element, which contrasts with implementations in which light is incident on the optical elements at angles that are off-axis, that is, high angles of incidence. By utilizing on-axis configurations, embodiments are characterized by high levels of optical performance in contrast with off-axis configurations in which the optical elements may introduce aberrations such as astigmatism and coma.

Figure 3A:
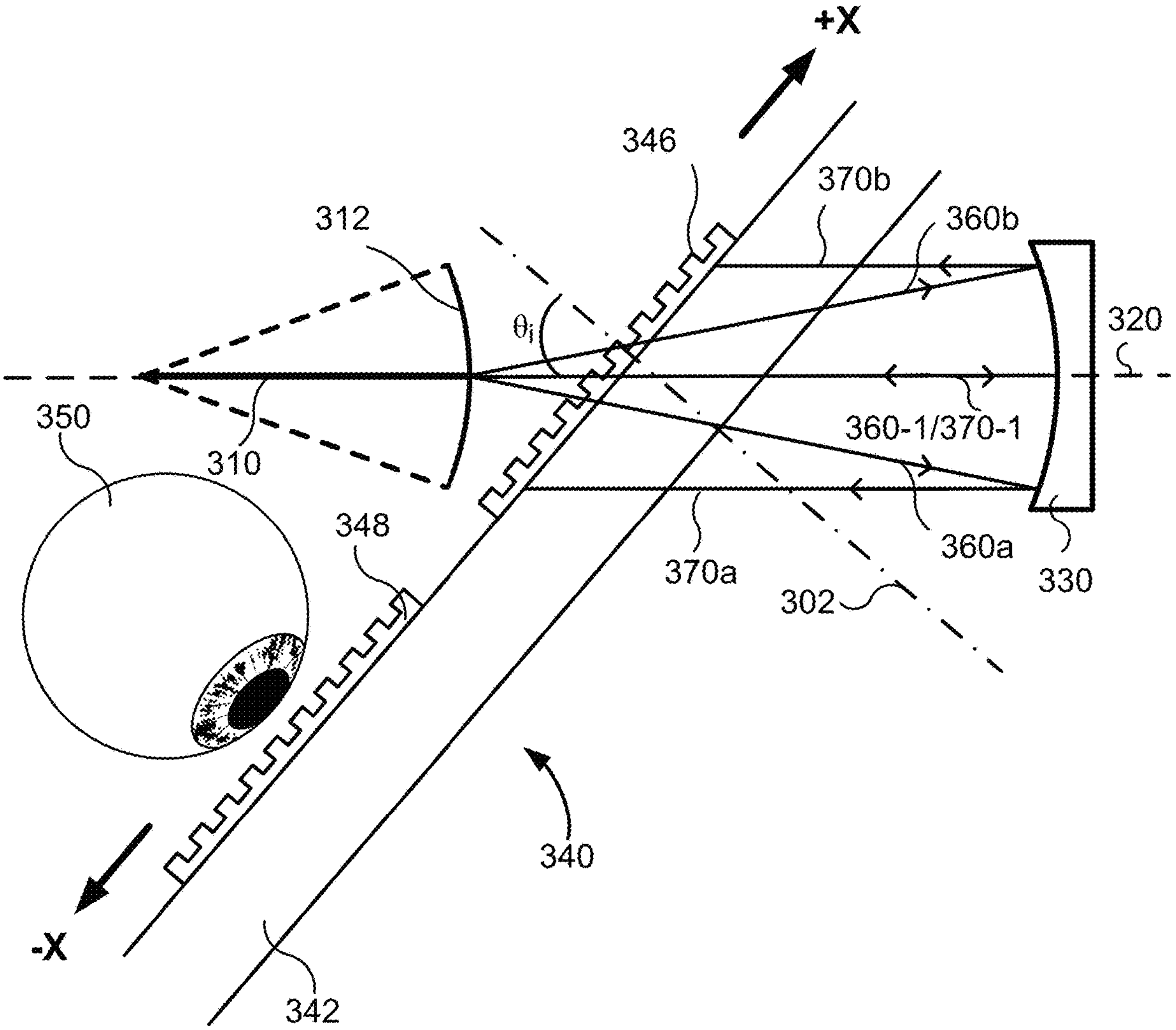
FIGS. 3A and 3B illustrate schematically a fiber scanning projector coupled to an eyepiece according to some embodiments.
Figure 3B:
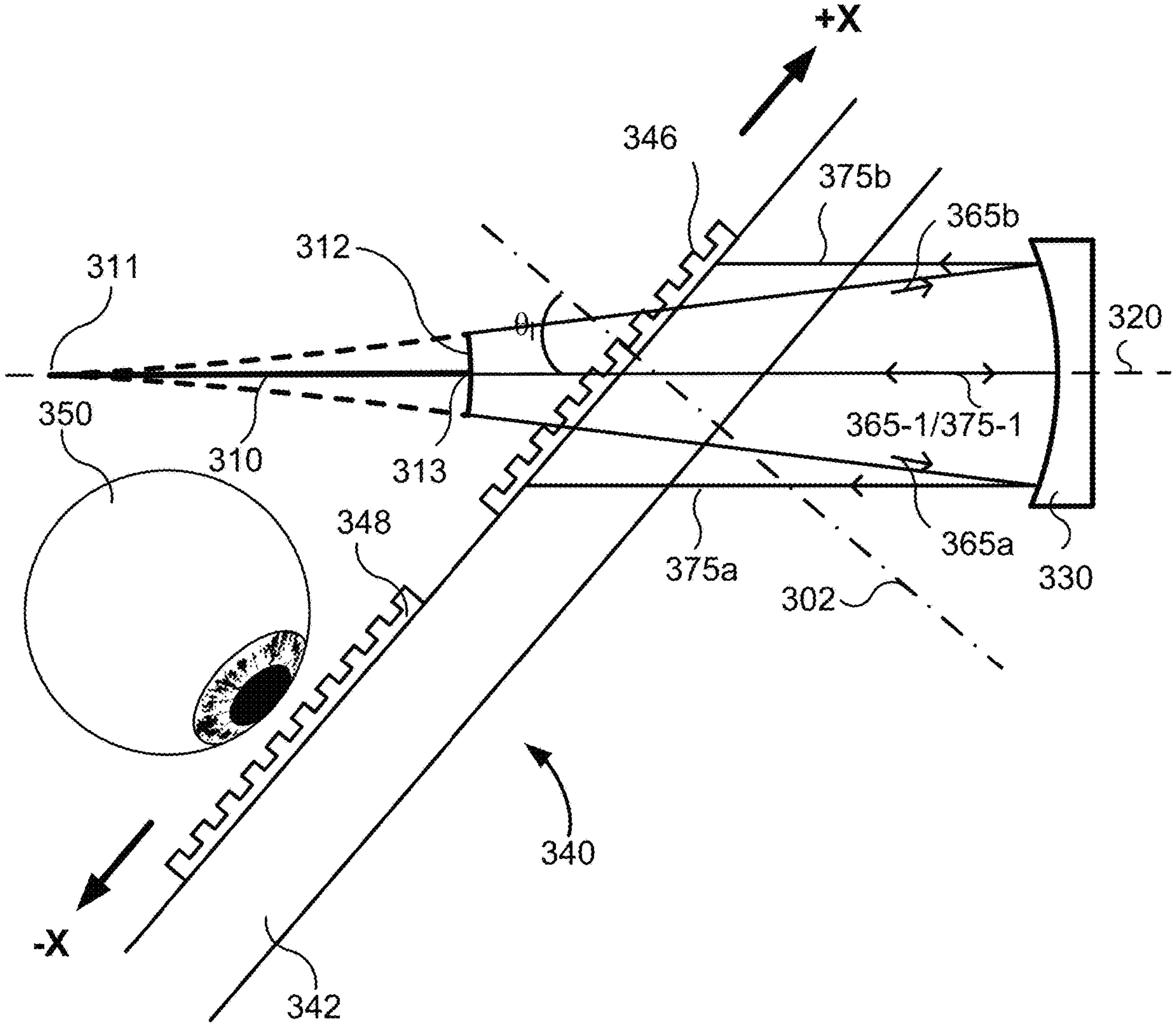

FIG. 3A illustrates schematically a fiber scanning projector coupled to an eyepiece according to some embodiments. The fiber scanning projector may include an optical fiber 310 (or another suitable waveguide scanner). The optical fiber 310 may be deflected such that the trajectory of its tip defines a two-dimensional convex object surface 312 (e.g., a part of a spherical surface). An optical axis 320 may be defined as a line that passes through the optical fiber 310 when the optical fiber 310 is not deflected. For example, the optical axis 320 may pass through the center of the convex object surface 312. The fiber scanning projector may further include a collimating optical element 330, such as a concave mirror, positioned in an on-axis configuration along the optical axis 320. In this on-axis configuration, the optical axis 320 is aligned with the normal to the center of the collimating optical element 330. As the light exits the tip of the optical fiber 310, the light beam may diverge as a cone of light rays (e.g., bounded by the marginal rays 360*a* and 360*b* as illustrated in FIG. 3A) with a subtended angle determined by the numerical aperture of the optical fiber 310. Accordingly, the collimating optical element 330 may be configured to receive a divergent input light beam characterized by marginal rays 360*a* and 360*b* emitted from the tip of the optical fiber 310, and produce a collimated light beam characterized by marginal rays 370*a* and 370*b* as a reflected light beam. Although only a single divergent input light beam is illustrated in FIG. 3A for the undeflected position of the optical fiber, as illustrated in FIG. 3B, the spatial extent of the collimating optical element 330 will be such that divergent input light beams produced by the fiber tip across the range of deflection angles will be captured and collimated by the collimating optical element 330.

As illustrated in FIG. 3A, the deflection of optical fiber 310 defines a convex object surface 312. In some embodiments, the collimating optical element 330 may have a reflecting surface that can be a substantially spherical mirror having twice the radius of curvature of the radius of curvature of the convex object surface 312. Accordingly, in some embodiments, the majority of focusing is achieved using collimating optical element 330, which can be implemented as a curved mirror with an aspheric correction term. In alternative embodiments, the reflecting surface is characterized by a radius of curvature that is greater than twice the radius of the scanning surface, i.e., convex object surface 312.

In some embodiments, the profile of the reflecting surface of collimating optical element 330 may vary from a curvature twice the radius of curvature of the convex object surface 312, for example, as a function of the index of refraction of the intermediate components in the light path (e.g., the index of refraction of the waveguide 342) and the angle of incidence, which may accommodate the asymmetric configuration due to the tilting of the waveguide 342 with respect to the optical axis 320.

Referring to FIG. 3A, the waveguide 342 and the incoupling DOE 346 are tilted at an angle $\theta_i$ with respect to the optical axis 320. As a result, light from optical fiber 310 may be incident upon waveguide 342 at various and asymmetric angles. For example, ray 360*a* has angle of incidence less than the angle of incidence of ray 360*b*; that is, ray 360*b* is closer to a grazing incidence than 360*a*. Although, for purposes of clarity, rays propagating through waveguide 342 are illustrated as not refracting, in actual practice, the difference in inputs angles will result in a difference in refraction angle and transmission through waveguide 342. Accordingly, in some embodiments, to compensate for the non-zero angle $\theta_i$ between the normal 302 of the surface of the waveguide 342 and the optical axis 320, asymmetrics impressed on the convex object surface 312 after propagation through waveguide 342 are compensated for by modification of the curvature of collimating optical element 330. In these embodiments, the curvature or concavity of collimating optical element 330 can vary as a function of position based on the angle $\theta_i$ as well as the index of refraction and thickness of waveguide 342 as well as other optical elements through which the diverging beam passes. By varying the curvature of the collimating optical element 330 as a function of position, compensation for the impact of the tilted orientation of the waveguide relative to the optical axis 320 of the optical fiber 310 and any resulting impact on the propagation angles of light rays emitted by the optical fiber 310 is provided by some embodiments.

As illustrated in FIG. 3A, an eyepiece 340 may be positioned between the tip of the optical fiber 310 and the collimating optical element 330. The eyepiece 340 may include a planar waveguide 342 tilted with respect to the optical axis 320, such that a normal 302 of the surface of the waveguide 342 forms a non-zero angle $\theta_i$ with respect to the optical axis 320. The eyepiece 340 may further include an incoupling diffractive optical element (DOE) 346, for example, an incoupling grating (ICG) that is coupled to a first lateral region of the waveguide 342 that intercepts the optical axis 320.

The eyepiece 340 may further include an outcoupling diffractive optical element (DOE) 348 (e.g., an outcoupling grating) that is coupled to a second lateral region of the surface of the waveguide 342 that is displaced from the first lateral region by a predetermined distance. The outcoupling DOE 348 may comprise a diffraction grating that is configured to diffract a portion of light propagating in the waveguide 342 out of the waveguide 342 and toward an eye 350 of a viewer. For example, the outcoupling DOE 348 may be the exit pupil expander (EPE) discussed above in relation to FIG. 2A. To facilitate the discussion below, the direction oriented along the plane of the waveguide pointing from the incoupling DOE 346 toward the outcoupling DOE 348 as the "−X" direction, and the opposite direction as the "+X" direction, as illustrated in FIGS. 3A and 3B and 4A and 4B.

With reference to FIG. 3B, the optical fiber 310 has a proximal end 311 and a distal end 313. In some embodiments, an image-wise modulated light beam is generated by a suitable image-wise modulated light beam generating assembly. The image-wise modulated light beam is received into the optical fiber 310 at the proximal end 311 of the optical fiber 310 and emitted by the optical fiber 310 at the distal end 313 of the optical fiber 310. In an embodiment, the fiber scanning projector includes a scanning mechanism configured to controllably deflect the optical fiber to scan the image-wise modulate light beam to produce a scanned light beam that forms an image.

In an embodiment, as the scanned light beam exits the tip of the optical fiber 310, the scanned light beam covers a cone-shaped volume (e.g., bounded by the light beams 365*a* and 365*b* as illustrated in FIG. 3B) with a subtended angle determined by the range of deflection of the optical fiber relative to the optical axis 320 and the extent by which the scanned light beam diverges as illustrated in FIG. 3A. In some embodiments, the collimating optical element 330 is configured to receive the scanned light beam for all deflected positions of the optical fiber 310. For example, light beams 365*a* and 365*b* illustrate the scanned light beam as emitted from the tip of the optical fiber 310 in two different maximum deflection configuration of the optical fiber 310. The light beam 365*a* is reflected by the collimating optical element 330 to produce a corresponding collimated light beam 375*a*. The light beam 365*b* is reflected by the collimating optical element 330 to produce a corresponding collimated light beam 375*b*. Likewise, an on-axis light beam 365-1 is reflected by the collimating optical element 330 to produce on-axis reflected light beam 375-1. In some embodiments, the collimating optical element 330 is configured so as to reflect the scanned light beam parallel to a common direction (e.g., parallel to the optical axis 320 or a direction substantially parallel to the optical axis 320) for all deflected configurations of the optical fiber 310.

As described more fully below in relation to FIGS. 4A and 4B, since the light from the optical fiber 310 is incident on the incoupling DOE 346 at an oblique angle of incidence, the diffractive coupling of the incident light into the waveguide 342 can be controlled to achieve desired diffractive coupling conditions.

Figure 4A:
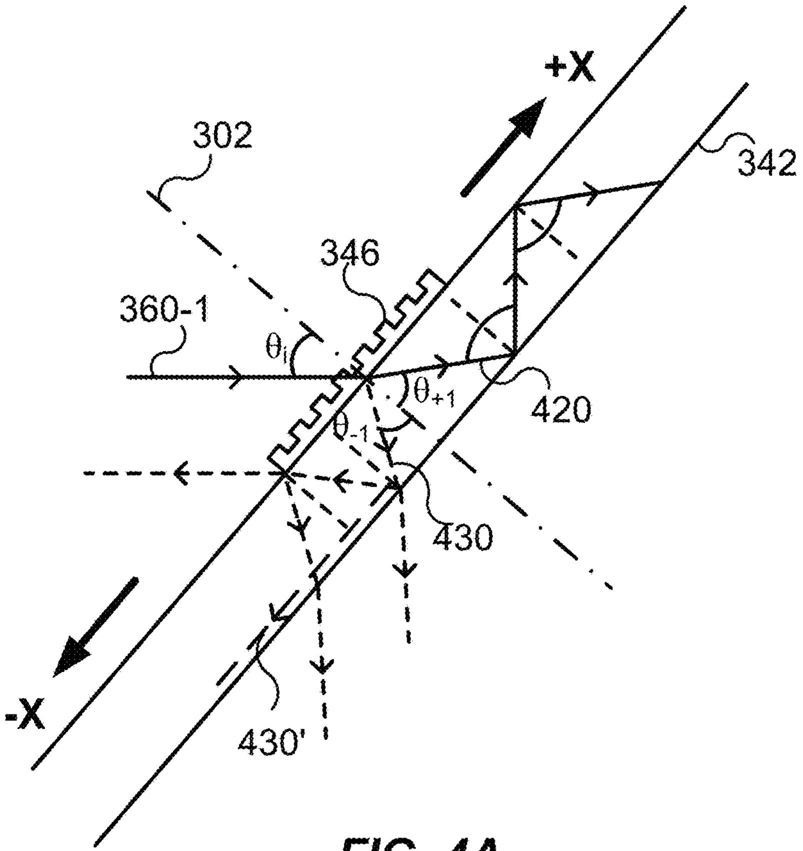
FIGS. 4A and 4B are simplified schematic diagrams illustrating diffractive coupling of light for an angled incoupling diffractive optical element as illustrated in FIGS. 3A and 3B on a first pass and a second pass, respectfully, according to an embodiment.

FIG. 4A is a simplified schematic diagram illustrating diffractive coupling of light for an angled incoupling DOE 346 as illustrated in FIG. 3A according to an embodiment. FIG. 4A illustrates schematically the optical effect of the incoupling DOE 346 as the scanned light beam (represented by central ray 360-1) emitted from the tip of the optical fiber 310 is incident on the incoupling DOE 346 on the first pass. For clarity, only the central ray 360-1 of the scanned light beam that is aligned with the optical axis 320 is shown. However, it will be appreciated that the analysis below is applicable to other rays of the scanned light beam. As illustrated in FIG. 4A, the incoupling DOE 346 may diffract a first portion of the scanned light beam (represented by central ray 360-1) as a positive first order ("+1") diffraction 420 (in a transmission geometry) at the diffraction angle $\theta_{+1}$, and a second portion of the scanned light beam (represented by central ray 360-1) as a negative first order ("−1") diffraction 430 (in a transmission geometry) at the diffraction angle $\theta_{-1}$. Because the central ray 360-1 is tilted at a non-zero angle of incidence $\theta_i$ with respect to normal 302 of the waveguide associated with the incoupling DOE 346, the angles of the diffracted orders will not be equal. In other words, if diffraction angle $\theta_{+1}$ is positive, then diffraction angle $\theta_{+1}$ will not be equal to the absolute value of diffraction angle $\theta_{-1}$. Accordingly, as described below, the diffracted orders will not experience uniform total internal reflection in the waveguide.

The operation of a diffraction grating may be governed by the grating equation:

$$\theta_m = \arcsin\left(\frac{m\lambda}{d} - \sin(\theta_i)\right),$$

where $\theta_m$ is the diffraction angle of light exiting (diffraction angle) the diffraction grating relative to a vector normal to the surface of the grating; $\lambda$ is the wavelength; m is an integer valued parameter known as the "order"; d is the period of the grating; and $\theta_i$ is the angle of incidence of light relative to the vector normal to the surface of the grating.

Thus, the diffraction angle $\theta_m$ for a particular order m (where m is non-zero) may depend on the angle of incidence $\theta_i$ and the period d of the grating.

According to some embodiments, the angle of incidence $\theta_i$ of the light making up the scanned light beam (which is determined by angle at which the waveguide 342 is tilted with respect to the optical axis 320) and the grating period d may be selected such that the positive first order diffraction 420 at the diffraction angle $\theta_{+1}$ may meet the total internal reflection (TIR) condition of the waveguide 342, and therefore may propagate in the waveguide 342 in the +X direction, whereas the negative first order diffraction 430 at the diffraction angle $\theta_{-1}$ may fail the TIR condition of the waveguide 342, and therefore may either propagate as an evanescent wave along the surface of the waveguide 342 in the −X direction (represented by the long-dashed line 430' in FIG. 4A) or be refracted out of the waveguide 342 at each bounce in the waveguide 342. Since the positive first order diffraction 420 propagates in the waveguide 342 in the +X direction away from the outcoupling DOE 348, it will not be diffracted by the outcoupling DOE 348 out of the waveguide 342 to reach the eye 350 of the viewer. Rather, a light trap or other light absorbing structure can be utilized as a beam dump to absorb light that is diffracted into the positive first order diffraction on the first pass.

Referring once again to FIG. 3A, a portion of the divergent input light beam characterized by marginal rays 360*a* and 360*b* and emitted from the tip of the optical fiber 310 may be transmitted through the incoupling DOE 346 (e.g., as a zeroth order transmission) to be incident on the collimating optical element 330 in an on-axis configuration. The collimating optical element 330 may reflect the divergent input light beam as a collimated light beam (e.g., as a bundle of parallel light rays bounded by the marginal rays 370*a* and 370*b* as illustrated in FIG. 3A) directed back toward the incoupling DOE 346 on a second pass. As before, although the ray at the edge of the divergent light beam is illustrated by marginal rays 360*a* and 360*b*, other rays will be collimated in a similar manner to form the collimated light beam represented by marginal rays 370*a* and 370*b*.

Figure 4B:
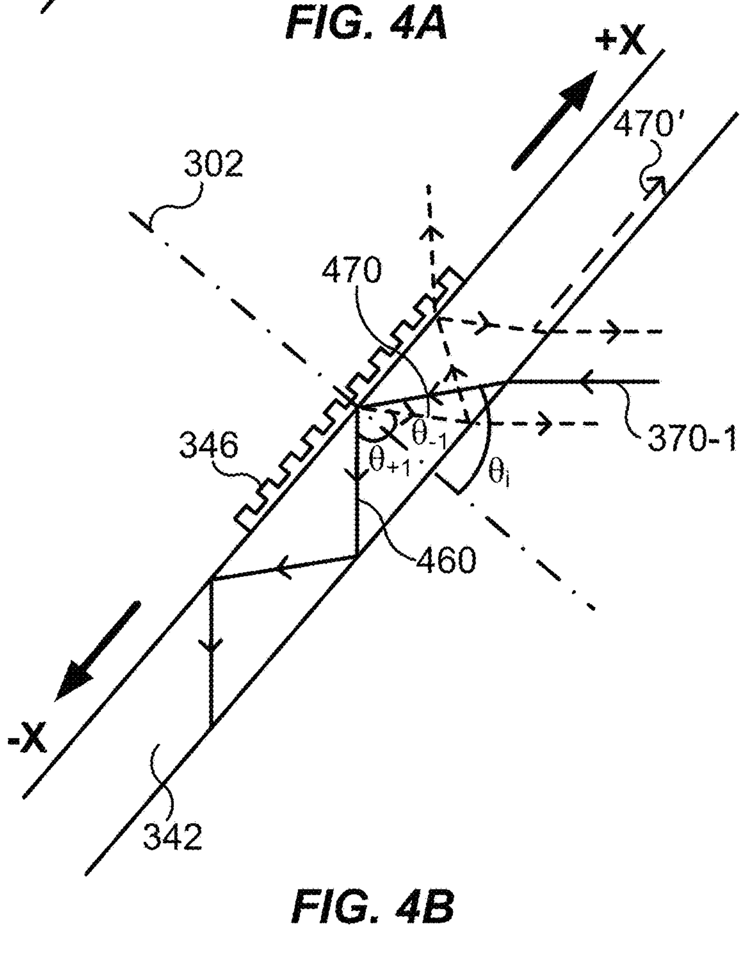

FIG. 4B is a simplified schematic diagram illustrating diffractive coupling of the collimated light beam illustrated by central ray 370-1 for an angled incoupling DOE 346 as illustrated in FIG. 3A according to an embodiment. For clarity, only the central ray 370-1 of the collimated light beam is shown. However, it will be appreciated that the analysis below is applicable to other rays of the collimated scanned light beam. As illustrated in FIG. 4B, the incoupling DOE 346 may diffract a first portion of the collimated light beam illustrated by central ray 370-1 as a positive first order ("+1") diffraction 460 (in a reflection geometry) at the diffraction angle $\theta_{+1}$, and a second portion of the collimated light beam illustrated by central ray 370-1 as a negative first order ("−1") diffraction 470 (in a reflection geometry) at the diffraction angle $\theta_{-1}$.

As discussed in relation to the light that was incident on the incoupling DOE during the first pass before collimation, because the central ray 370-1 of the collimated light beam is tilted at a non-zero angle of incidence $\theta_i$ with respect to the normal 302 of the waveguide associated with the incoupling DOE 346, the angles of the diffracted orders will not be equal. In other words, if diffraction angle $\theta_{+1}$ is positive, then diffraction angle $\theta_{+1}$ will not be equal to the absolute value of diffraction angle $\theta_{-1}$. Accordingly, as described below, the diffracted orders will not experience uniform total internal reflection in the waveguide.

Referring to FIG. 4B, because the central ray 370-1 of collimated light beam is incident on the incoupling DOE 346 from an opposite direction as compared to the central ray 360-1 of the scanned light beam 360 illustrated in FIG. 4A, the positive first order diffraction 460 may meet the TIR condition of the waveguide 342, and therefore may propagate in the waveguide 342 in the −X direction; whereas the negative first order diffraction 470 may fail the TIR condition of the waveguide 342, and therefore may either propagate as an evanescent wave along the surface of the waveguide 342 in the +X direction (represented by the long-dashed line 470' in FIG. 4B) or be refracted out of the waveguide 342 at each bounce in the waveguide 342. Since the positive first order diffraction 460 propagates in the waveguide 342 along the −X direction toward the outcoupling DOE 348, it may be diffracted by the outcoupling DOE 348 out of the waveguide 342 to reach the eye 350 of the viewer.

As described above, by exploiting the asymmetrical behavior of the incoupling DOE 346 and the waveguide 342 in the angled configuration of the eyepiece 340 with respect to the fiber scanning projector, efficient coupling of the scanned light beam emitted from the optical fiber 310 into the waveguide 342 may be achieved using an on-axis collimating optical element 330. This optical configuration avoids using a polarizing beam splitter as discussed in U.S. patent application Ser. No. 15/927,765. As such, a non-polarized scanned light beam may be transported by using a non-polarization-maintaining optical fiber, which can remediate one or more technical difficulties associated with conventional techniques. The fiber scanning projector illustrated in FIGS. 3A and 3B may also have the advantage of having fewer optical components as compared to the configurations that use a polarizing beam splitter, and thus may be easier to manufacture. The on-axis configuration of the collimating optical element 330 may prevent off-axis aberrations, such as astigmatism and coma, which can be difficult to correct in a single-element collimating optical element 330.

In some embodiments, the incoupling DOE 346 may be blazed (i.e., given a particular periodic profile), so as to preferentially diffract light into desired diffraction orders. For example, the incoupling DOE 346 may be blazed such that the intensity of the positive first order diffraction 460 may be higher than the intensity of the negative first order diffraction 470, so as to maximize the fraction of the scanned light beam reaching the eye 350 of the viewer.

In addition, the incoupling DOE 346 may be configured to have a higher efficiency in the reflection orders than the transmission orders, so that the incoupling DOE 346 may have a higher coupling efficiency as the scanned light beam incident on the incoupling DOE 346 on the second pass than that as the scanned light beam incident on the incoupling DOE 346 on the first pass. As such, a smaller fraction of the scanned light beam may be wasted on the first pass, resulting in a larger fraction of the scanned light beam reaching the eye 350 of the viewer.

The periodic structure of the incoupling DOE 346 may include a surface relief profile or a volume modulation of the index of refraction of a transparent material according to various embodiments. In some embodiments, the incoupling DOE 346 may include a metasurface. A metasurface is an optically thin subwavelength structured interface. Metasurfaces are generally created by assembling arrays of miniature, anisotropic light scatterers (i.e., resonators such as optical antennas). The spacing between antennas and their dimensions are much smaller than the wavelength. The metasurfaces, on account of Huygens principle, are able to mold optical wavefronts into arbitrary shapes with subwavelength resolution by introducing spatial variations in the optical response of the light scatterers. Metasurfaces may allow controlling the polarization, phase and amplitude of light. The factors that can be used to manipulate the wavefront of the light include the material, size, geometry and orientation of the nano structures. The resonant wavelength of a metasurface can be engineered by changing the geometric sizes of its constituent nano structures, thereby providing wavelength selectivity. For example, metasurfaces may be engineered to be highly wavelength-selective in redirecting light. Thus, metasurfaces can be used as wavelength-selective incoupling optical elements and outcoupling optical elements. Additional descriptions of metasurface diffractive optical elements are provided in U.S. patent application Ser. No. 15/683,644, filed on Aug. 22, 2017, the disclosure of which is hereby incorporated by reference in its entirety for all purposes.

Figure 5A:
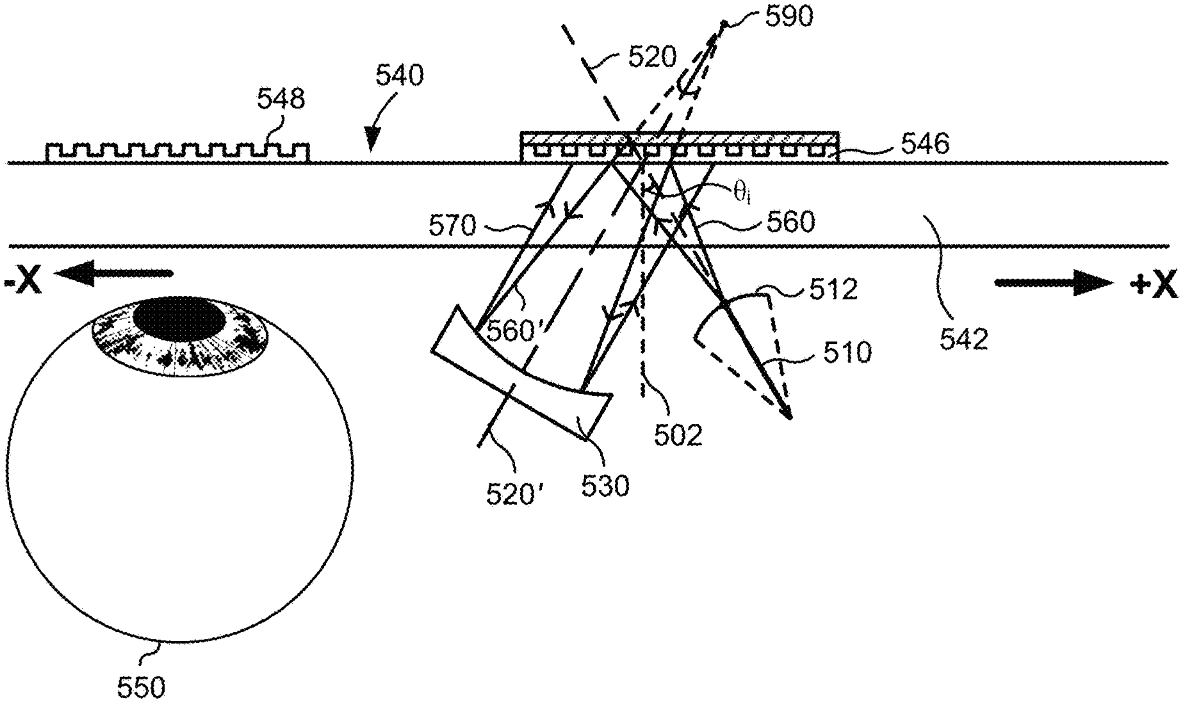
FIGS. 5A and 5B illustrate schematically a fiber scanning projector coupled to an eyepiece according to some other embodiments.

FIG. 5A illustrates schematically a fiber scanning projector coupled to an eyepiece 540 according to some other embodiments. The eyepiece 540 includes a planar waveguide 542, an incoupling DOE 546 coupled to a first lateral region of the back surface of the waveguide 542, and an outcoupling DOE 548 coupled to a second lateral region of the waveguide 542. Note the outcoupling DOE 548 is illustrated in FIG. 5A as coupled to the back surface of the waveguide 542, but it can be coupled to either the front surface or the back surface. The back of the incoupling DOE 546 is metallized so that the incoupling DOE 546 may operate in a reflection geometry. Generally, a metallized incoupling DOE may have higher coupling efficiencies than a non-metallized incoupling DOE. The outcoupling DOE 548 may comprise a diffraction grating (may be referred herein as an outcoupling grating) configured to diffract a portion of light propagating in the waveguide 542 out of the waveguide 542 and toward an eye 550 of a viewer. To facilitate the discussion below, let's denote the direction pointing from the incoupling DOE 546 toward the outcoupling DOE 548 as the "−X" direction, and the opposite direction as the "+X" direction, as illustrated in FIGS. 5A and 5B and FIGS. 6A and 6B.

The fiber scanning projector includes an optical fiber 510 (or another suitable waveguide scanner). The optical fiber 510 may be deflected such that the trajectory of its tip defines a two-dimensional convex object surface 512 (e.g., a part of a spherical surface). An optical axis 520 may be defined as a line that passes through the optical fiber 510 when the optical fiber 510 is not deflected. For example, the optical axis 520 may pass through the center of the convex object surface 512. The optical fiber 510 is positioned relative to the eyepiece 540 in an angled configuration such that the optical axis 520 forms a non-zero angle $\theta_i$ with respect to a normal 502 of the waveguide 542. As described more fully below in relation to FIGS. 6A and 6B, since the light from the optical fiber 510 is incident on the incoupling DOE 546 at an oblique angle of incidence, the diffractive coupling of the incident light into the waveguide 542 can be controlled to achieve desired diffractive coupling conditions.

Because the incoupling DOE 546 is metallized, a portion of the input light beam 560 may be reflected by the incoupling DOE 546 (e.g., as a zeroth order reflection) on the first pass, and appear as a divergent input light beam emitted from the virtual object point 590. As described below in relation to FIG. 6A, the incoupling DOE 546 will also diffract the input light beam 560 into other diffracted orders (e.g., positive first order diffraction and negative first order diffraction).

The fiber scanning projector may further include a collimating optical element 530, such as a concave mirror, positioned on the same side of the eyepiece 540 as the optical fiber 510. The collimating optical element 530 is positioned in an on-axis configuration to receive the divergent input light beam 560' reflected by the metallized incoupling DOE 546 (i.e., the zeroth order reflection). The collimating optical element 530 collimates the input light beam as a collimated reflected light beam 570 directed back toward the incoupling DOE 546 on a second pass.

Figure 5B:
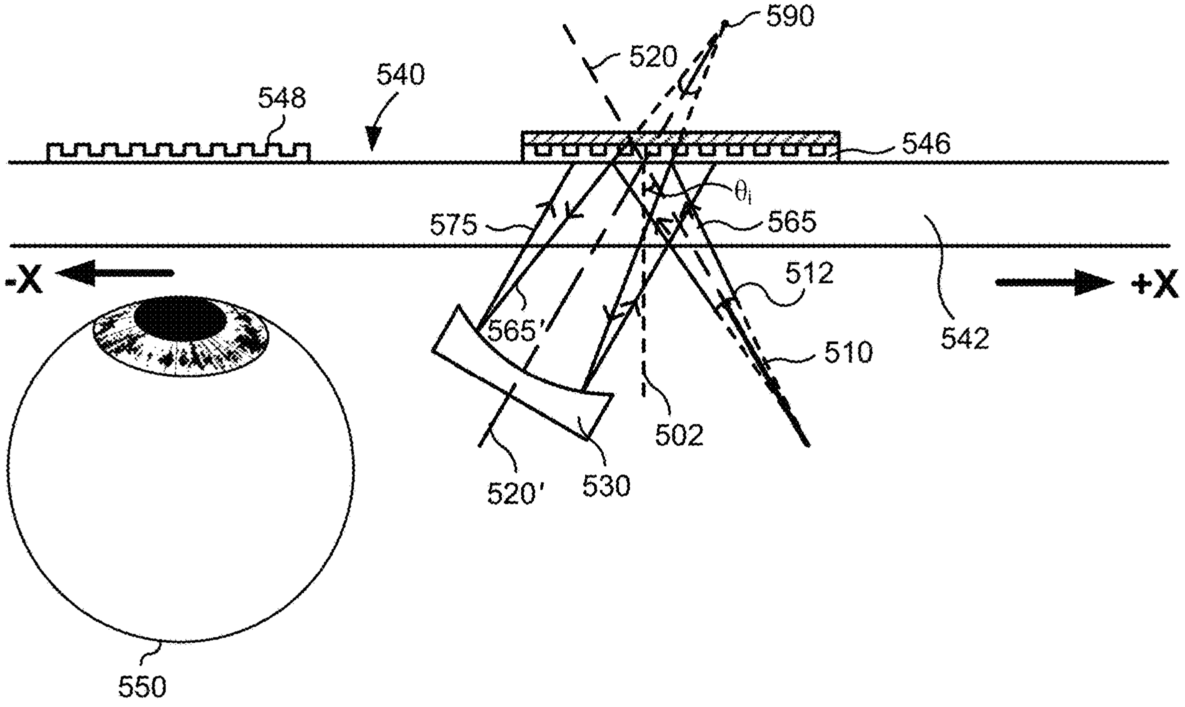

With reference to FIG. 5B, the optical fiber 510 has a proximal end and a distal end. In some embodiments, an image-wise modulated light beam is generated by a suitable image-wise modulated light beam generating assembly. The image-wise modulated light beam is received into the optical fiber 510 at the proximal end of the optical fiber 510 and emitted by the optical fiber 510 at the distal end of the optical fiber 510. In an embodiment, the fiber scanning projector includes a scanning mechanism configured to controllably deflect the optical fiber 510 to scan the image-wise modulate light beam to produce a scanned light beam that forms an image.

In an embodiment, as the scanned light beam exits the tip of the optical fiber 510, the scanned light beam covers a cone-shaped volume (e.g., bounded by the light beam 565 as illustrated in FIG. 5B) with a subtended angle determined by the range of deflection of the optical fiber 510 relative to the optical axis 520 and the extent by which the scanned light beam diverges as illustrated in FIG. 5A. A portion of the scanned light beam 565 may be reflected by the incoupling DOE 546 (e.g., as a zeroth order reflection) on the first pass, and appear as a divergent scanned light beam 565' emitted from the virtual object point 590. As described below in relation to FIG. 6A, the incoupling DOE 546 will also diffract the scanned light beam 565 into other diffracted orders (e.g., positive first order diffraction and negative first order diffraction).

In some embodiments, the collimating optical element 530 is configured to receive the scanned light beam for all deflected positions of the optical fiber 510. The scanned light beam 565' is reflected by the collimating optical element 530 to produce a corresponding collimated scanned light beam 575. In an embodiment, the collimating optical element 530 is configured so as to reflect the scanned light beam parallel to a common direction (e.g., parallel to the optical axis 520' of the collimating optical element 530 or a direction substantially parallel to the optical axis 520') for all deflected configurations of the optical fiber 510.

Figure 6A:
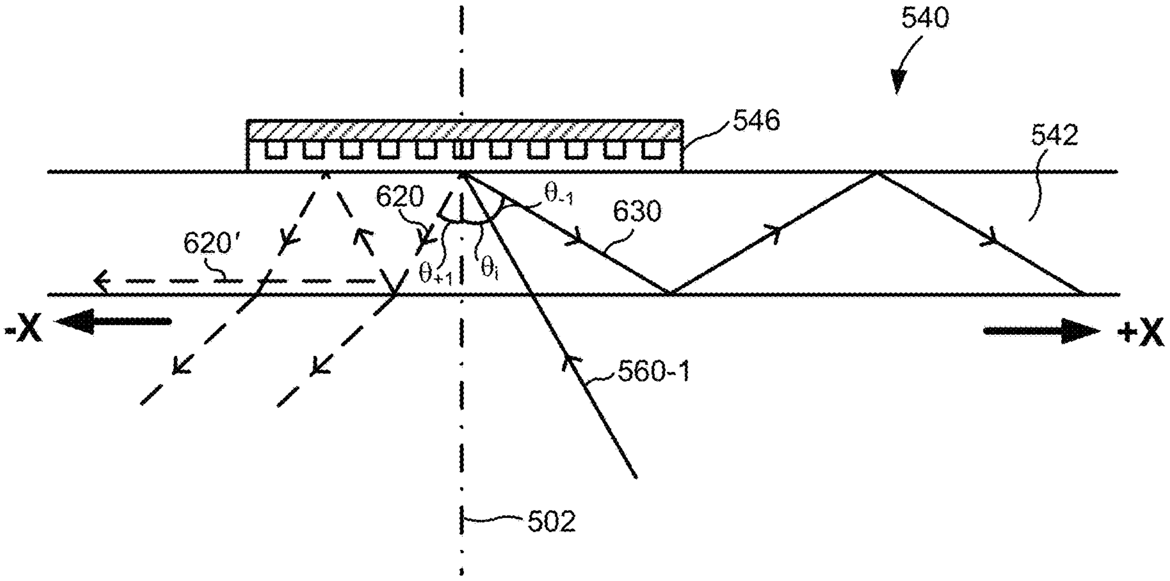
FIGS. 6A and 6B are simplified schematic diagrams illustrating diffractive coupling of light for an angled incoupling diffractive optical element as illustrated in FIGS. 5A and 5B on a first pass and a second pass, respectfully, according to an embodiment.

FIG. 6A is a simplified schematic diagram illustrating diffractive coupling of light for an angled incoupling DOE 546 as illustrated in FIGS. 5A and 5B according to an embodiment. For clarity, only the central ray 560-1 of the scanned light beam 560 is shown. As illustrated, the incoupling DOE 546 may diffract a first portion of the scanned light beam 560 as a positive first order ("+1") diffraction 620 (in a reflection geometry) at the diffraction angle $\theta_{+1}$, and a second portion of the scanned light beam 560 as a negative first order ("−1") diffraction 630 (in a reflection geometry) at the diffraction angle $\theta_{-1}$. Similar to the incoupling DOE 346 illustrated in FIGS. 3A and 3B and FIGS. 4A and 4B, the angle of incidence $\theta_i$ and the grating period d of the incoupling DOE 546 may be selected such that the negative first order diffraction 630 at the diffraction angle $\theta_{-1}$ may meet the TIR condition of the waveguide 542, and therefore may propagate in the waveguide 542 in the +X direction, whereas the positive first order diffraction 620 at the diffraction angle $\theta_{+1}$ may fail the TIR condition of the waveguide 542, and therefore may either propagate as an evanescent wave along the surface of the waveguide 542 in the −X direction (represented by the long-dashed line 620' in FIG. 6A) or be refracted out of the waveguide 542 at each bounce in the waveguide 542, as illustrated in FIG. 6A. Accordingly, selection of the angle of incidence $\theta_i$ and the grating period d of the incoupling DOE 546 may result in little to no light diffracted into the first positive order reflection 620 reaching the outcoupling DOE 548. Since the negative first order diffraction 630 propagates in the waveguide 542 in the +X direction away from the outcoupling DOE 548, it may not be diffracted by the outcoupling DOE 548 out of the waveguide 542 to reach the eye 550 of the viewer as illustrated in FIG. 5A. Rather, a light trap or other light absorbing structure can be utilized as a beam dump to absorb light that is diffracted into the negative first order diffraction 630 on the first pass.

Figure 6B:
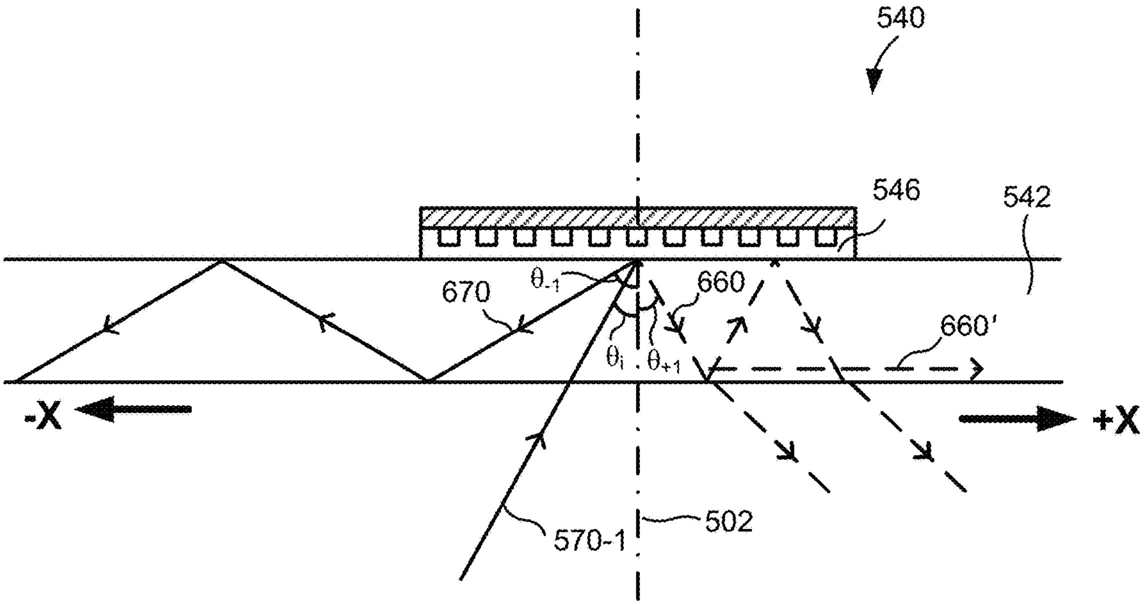

FIG. 6B is a simplified schematic diagram illustrating diffractive coupling of the collimated light beam 570 for an angled incoupling DOE 546 as illustrated in FIG. 5A according to an embodiment. For clarity, only the central ray 570-1 of the collimated light beam 570 is shown. However, it will be appreciated that the analysis below is applicable to other rays of the collimated scanned light beam 570. As illustrated, the incoupling DOE 546 may diffract a first portion of the collimated light beam 570 as a positive first order ("+1") diffraction 660 (in a reflection geometry), and a second portion of the collimated light beam 650 as a negative first order ("−1") diffraction 670 (in a reflection geometry). Now because the collimated light beam 570 is incident on the incoupling DOE 546 from an opposite direction as compared to the scanned light beam 560 illustrated in FIG. 6A, the negative first order diffraction 670 may meet the TIR condition of the waveguide 542, and therefore may propagate in the waveguide 542 in the −X direction, whereas the positive first order diffraction 660 may fail the TIR condition of the waveguide 542, and therefore may either propagate as an evanescent wave along the surface of the waveguide 542 in the +X direction (represented by the long-dashed line 660' in FIG. 6B) or be refracted out of the waveguide 542 at each bounce in the waveguide 542, as illustrated in FIG. 6B. Since the negative first order diffraction 670 propagates in the waveguide 542 along the −X direction toward the outcoupling DOE 548, it may be diffracted by the outcoupling DOE 548 out of the waveguide 542 to reach the eye 550 of the viewer.

The angle $\theta_i$ between the optical axis 520 and the normal 502 of the waveguide 542 may be selected to facilitate the asymmetric behavior of the incoupling DOE 546 and the waveguide 542, as described above. Other geometrical considerations may also be taken into account. For example, the angle $\theta_i$ may be selected so as to avoid any conflict between the trajectory 512 of tip of the optical fiber 510 and the collimating optical element 530. In various embodiments, the angle $\theta_i$ may be selected, for example, to be 15°, 20°, 25°, 30°, 35°, 40°, or 45°. In some other embodiments, the collimating optical element 530 may have a hole through which the optical fiber 510 may pass, similar to the configuration illustrated in FIG. 5 of U.S. patent application Ser. No. 15/927,765. This configuration may be used where the angle $\theta_i$ is selected such that the optical fiber 510 would otherwise be in geometrical conflict with the collimating optical element 530.

Figure 7A:
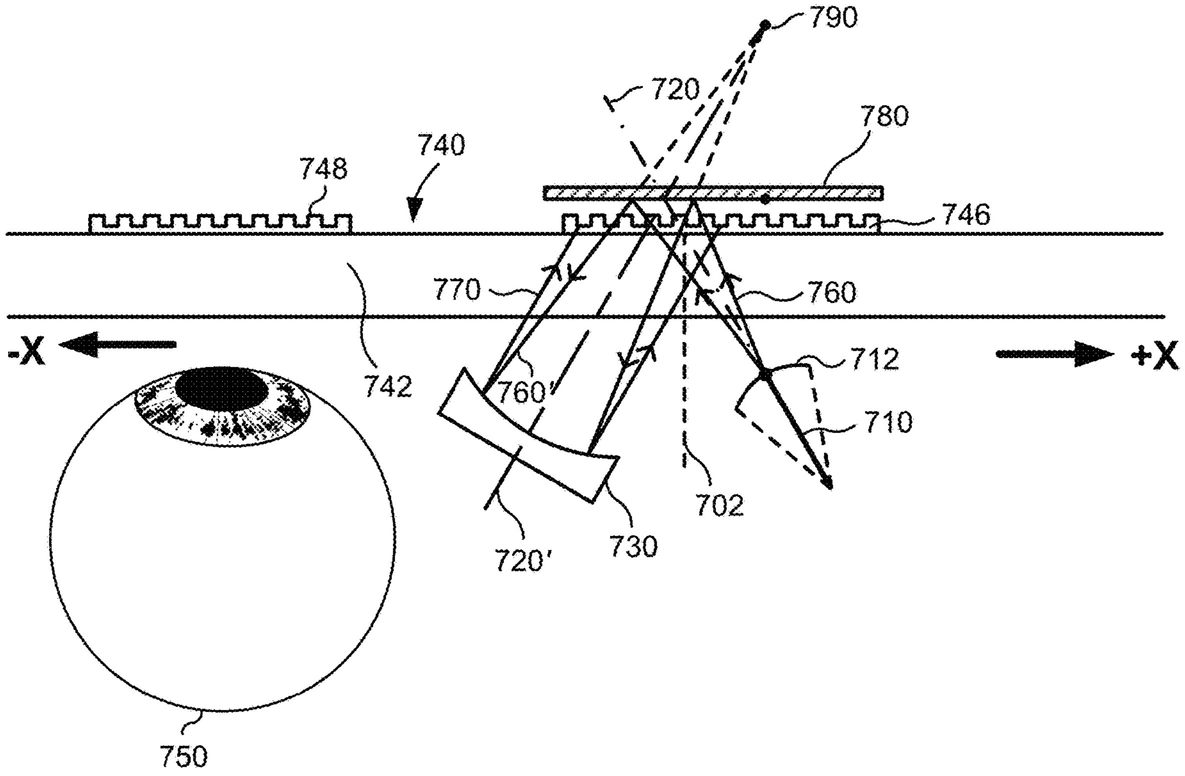
FIGS. 7A and 7B illustrate schematically a fiber scanning projector coupled to an eyepiece according to some further embodiments.

FIG. 7A illustrates schematically a fiber scanning projector coupled to an eyepiece 740 according to some further embodiments. Similar to the eyepiece 540, the eyepiece 740 includes a planar waveguide 742, an incoupling DOE 746 coupled to a first lateral region of the back surface of the waveguide 742, and an outcoupling DOE 748 coupled to a second lateral region of the waveguide 742 (although the outcoupling DOE 748 is illustrated as coupled to the back surface of the waveguide 742 in FIG. 7A, but it can be coupled to either the front surface or the back surface). The outcoupling DOE 748 may comprise a diffraction grating (may be referred herein as an outcoupling grating) configured to diffract a portion of light propagating in the waveguide 742 out of the waveguide 742 and toward an eye 750 of a viewer. Here, the back of the incoupling DOE 746 is not metallized. Instead, the eyepiece 740 includes a separate planar mirror 780 positioned behind and spaced apart from the incoupling DOE 746.

The fiber scanning projector includes an optical fiber 710 (or a waveguide). The optical fiber 710 may be deflected such that the trajectory of its tip defines a two-dimensional convex object surface 712 (e.g., a part of a spherical surface). An optical axis 720 may be defined as a line that passes through the optical fiber 710 when the optical fiber 710 is not deflected. For example, the optical axis 720 may pass through the center of the convex object surface 712. The optical fiber 710 is positioned relative to the eyepiece 740 such that the optical axis 720 forms a non-zero angle $\theta_i$ with respect to a normal 702 of the waveguide 742. A portion of the input light beam 760 may pass through the incoupling DOE 746 on the first pass, and be reflected by the planar mirror 780. Thus, the input light beam 760 may appear as a divergent input light beam emitted from the virtual object point 790.

The fiber scanning projector may further include a collimating optical element 730, such as a concave mirror, positioned on the same side of the eyepiece 740 as the optical fiber 710. The collimating optical element 730 is positioned in an on-axis configuration to receive the divergent input light beam 760. The collimating optical element 730 reflects the input light beam 760 as a collimated light beam 770 directed back toward the incoupling DOE 746 on a second pass.

Similar to the fiber scanning projector illustrated in FIGS. 5A and 5B, the angle of incidence $\theta_i$ and the grating period d of the incoupling DOE 746 may be selected such that, for the input light beam 760 incident on the incoupling DOE 746 on the first pass, a negative first order diffraction (in a reflection geometry) may meet the TIR condition of the waveguide 742, whereas a positive first order diffraction (in a reflection geometry) may fail the TIR condition of the waveguide 742, similar to the illustration in FIG. 6A. For the collimated light beam 770 incident on the incoupling DOE 746 on the second pass, the negative first order diffraction (in a reflection geometry) may meet the TIR condition of the waveguide 742, and the positive first order diffraction (in a reflection geometry) may fail the TIR condition of the waveguide 742, similar to the illustration in FIG. 6B.

Figure 7B:
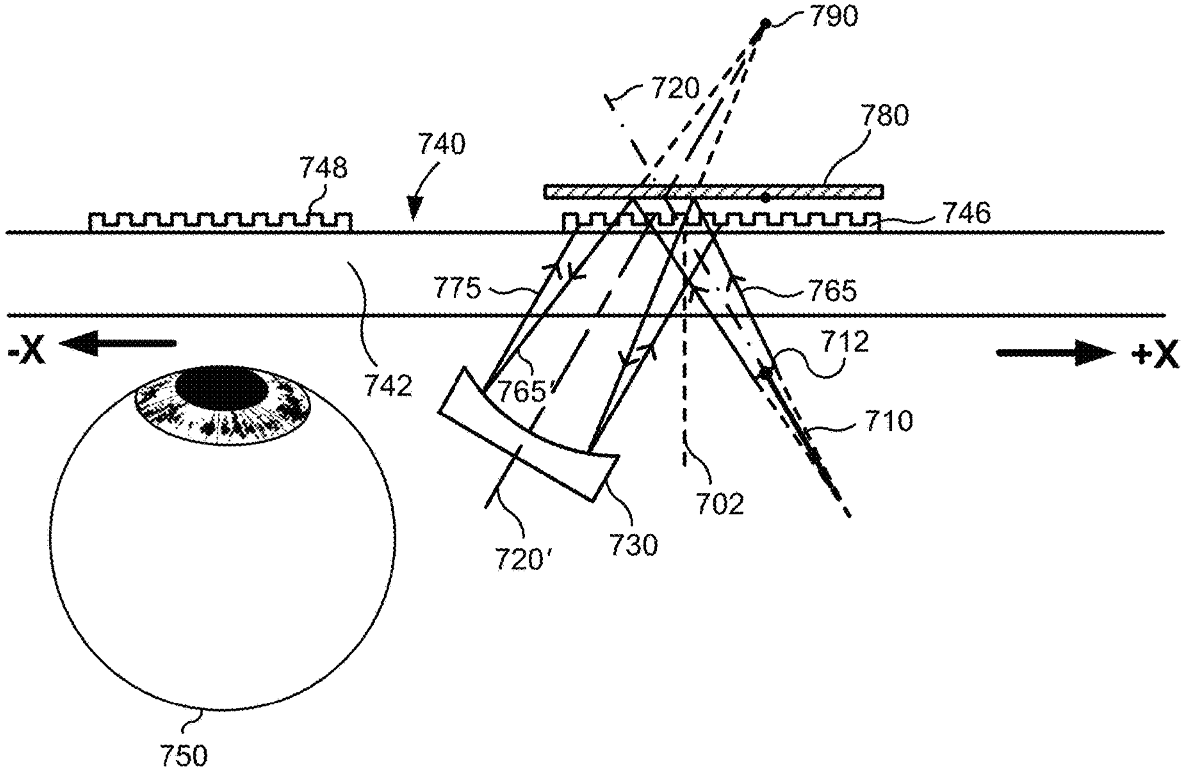

In general, an eyepiece may include an outcoupling DOE (e.g., the outcoupling DOE 548 illustrated in FIGS. 5A and 5B or the outcoupling DOE 748 illustrated in FIGS. 7A and 7B) configured to have the same grating parameters, including periodicity, as the incoupling DOE (e.g., the incoupling DOE 546 illustrated in FIGS. 5A and 5B or the incoupling DOE 746 illustrated in FIGS. 7A and 7B).

Figure 8:
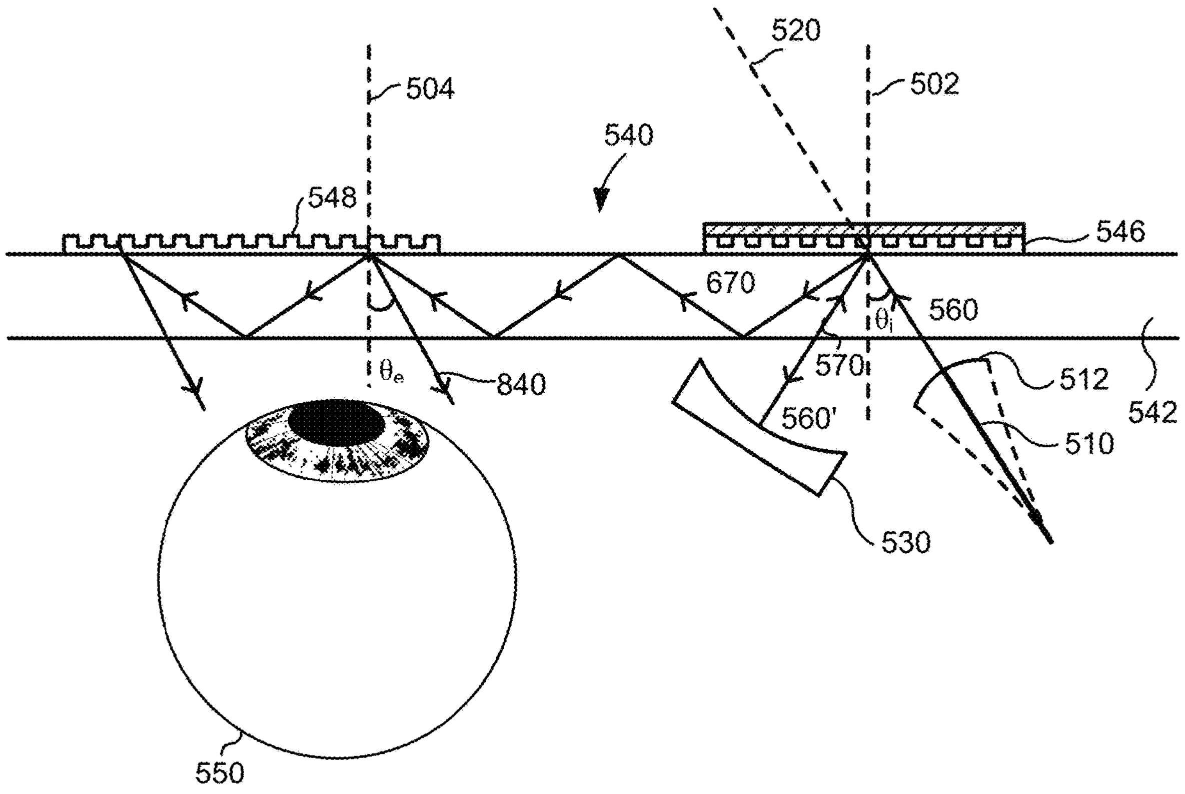
FIG. 8 illustrates schematically a fiber scanning projector coupled to an eyepiece according to some other embodiments.

FIG. 8 illustrates schematically a fiber scanning projector coupled to an eyepiece according to some other embodiments. In the system illustrated in FIGS. 5A and 5B, and FIGS. 6A and 6B and reproduced in FIG. 8, for an input light beam 560 incident on the waveguide 542 at an angle of incidence $\theta_i$, a diffracted light beam 670, as a negative first order diffraction produced by the metallized incoupling DOE 546 as the collimated light beam 570 is incident thereon on the second pass, may propagate in the waveguide 542 toward the outcoupling DOE 548, as discussed above with reference to FIG. 6B. If the outcoupling DOE 548 is configured to have the same grating parameters (e.g., having the same grating period d) as the incoupling DOE 546, the outcoupling DOE 548 may couple a portion of the light beam 670, e.g., as a negative first order diffraction 840 at an exit angle $\theta_e$ toward the eye 550 of the viewer, where $\theta_e$ is substantially equal to the angle of incidence $\theta_i$. Therefore, for the angled configuration of the fiber scanning projector with respect to the eyepiece 540 as illustrated in FIGS. 5A and 5B (or as illustrated in FIGS. 3A and 3B and FIGS. 7A and 7B), the light field projected to the eye 550 may cover only an angular field of view (FOV) that is biased on one side of the normal 504.

According to other embodiments, the eyepiece may be implemented in such a manner such that the outcoupling DOE 548 has a grating period d that is different from the grating period of the incoupling DOE 546. This may allow the outcoupling DOE 548 to diffract light at angles that differ from angles diffracted by the incoupling DOE 546.

With reference to FIG. 7B, the optical fiber 710 has a proximal end and a distal end. In some embodiments, an image-wise modulated light beam is generated by a suitable image-wise modulated light beam generating assembly. The image-wise modulated light beam is received into the optical fiber 710 at the proximal end of the optical fiber 710 and emitted by the optical fiber 710 at the distal end of the optical fiber 710. In an embodiment, the fiber scanning projector includes a scanning mechanism configured to controllably deflect the optical fiber to scan the image-wise modulate light beam to produce a scanned light beam that forms an image.

In an embodiment, as the scanned light beam exits the tip of the optical fiber 710, the scanned light beam covers a cone-shaped volume (e.g., bounded by the light beam 765 as illustrated in FIG. 7B) with a subtended angle determined by the range of deflection of the optical fiber 710 relative to the optical axis 720 and the extent by which the scanned light beam diverges as illustrated in FIG. 7A. A portion of the scanned light beam 765 may be reflected by the incoupling DOE 746 (e.g., as a zeroth order reflection) on the first pass, and appear as a divergent scanned light beam 765' emitted from the virtual object point 790. As described below in relation to FIG. 6A, the incoupling DOE 746 will also diffract the scanned light beam 760 into other diffracted orders (e.g., positive first order diffraction and negative first order diffraction).

In some embodiments, the collimating optical element 730 is configured to receive the scanned light beam for all deflected positions of the optical fiber 710. The scanned light beam 765' is reflected by the collimating optical element 730 to produce a corresponding collimated scanned light beam 775. In an embodiment, the collimating optical element 730 is configured so as to reflect the scanned light beam parallel to a common direction (e.g., parallel to the optical axis 720' of the collimating optical element 730 or a direction substantially parallel to the optical axis 720') for all deflected configurations of the optical fiber 710.

Figure 9:
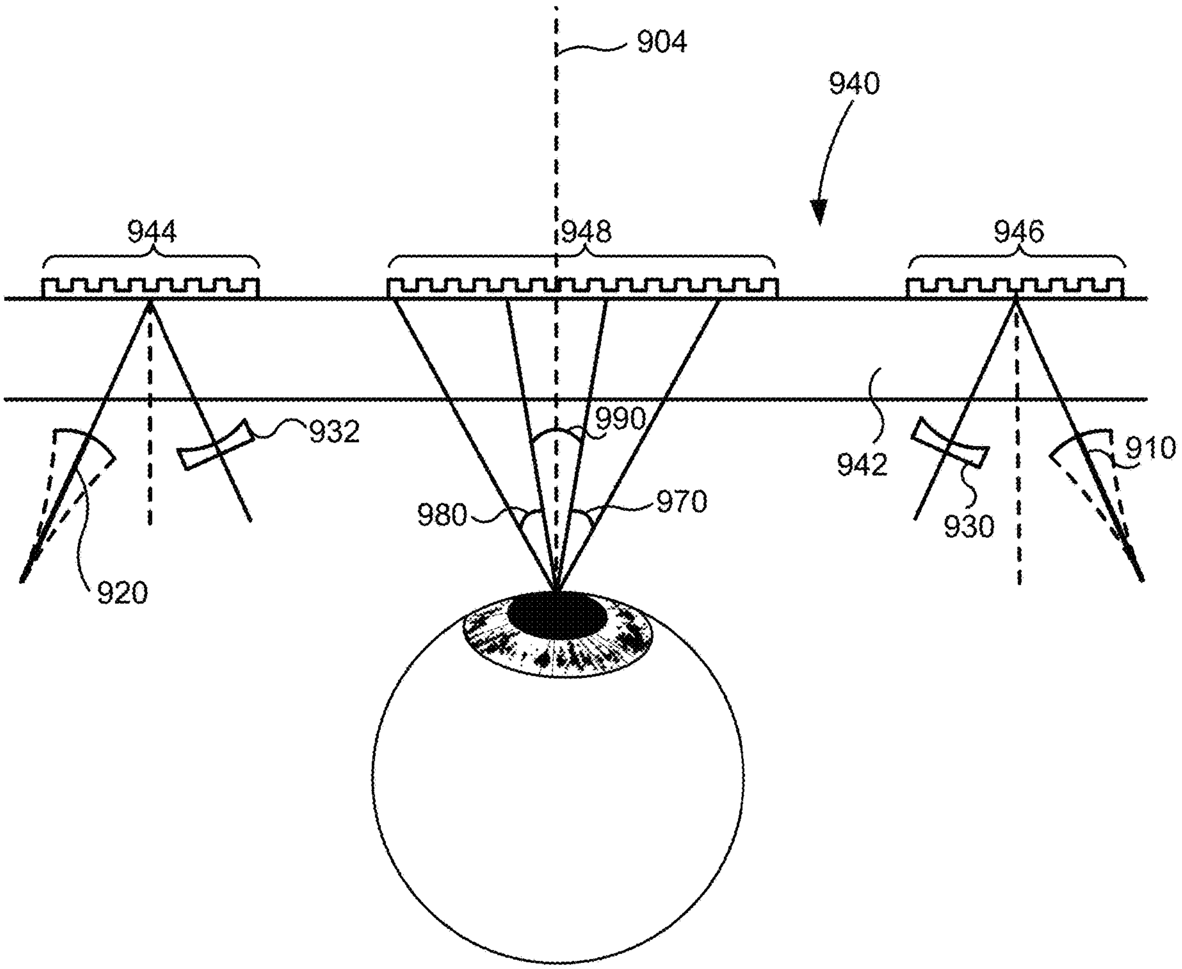
FIG. 9 illustrates schematically a configuration that includes two fiber scanning projectors coupled to an eyepiece according to some embodiments.

According to some embodiments, two fiber scanning projectors may be used in order to cover FOVs on both sides of the normal. FIG. 9 illustrates schematically an exemplary configuration that includes two fiber scanning projectors. An eyepiece 940 may include a waveguide 942, a first incoupling DOE 946 coupled to a first lateral region of the waveguide 942 on the right side, a second incoupling DOE 944 coupled to a second lateral region of the waveguide 942 on the left side, and an outcoupling DOE 948 (e.g., an EPE) coupled to a third lateral region of the waveguide 942 on the center. A first fiber scanning projector may include a first optical fiber 910 and a first collimating optical element 930, arranged in an angled-configuration with respect to the eyepiece 940 in the vicinity of the first incoupling DOE 946, similar to that illustrated in FIGS. 5A and 5B. A second fiber scanning projector may include a second optical fiber 920 and a second collimating optical element 932, also arranged in an angled-configuration with respect to the eyepiece 940 in the vicinity of the second incoupling DOE 944, as a mirror image of the first fiber scanning projector.

As illustrated, the first fiber scanning projector may project a light field in a first angular FOV 980 on the left side of the normal 904, whereas the second fiber scanning projector may be configured to project a light field in a second angular FOV 970 on the right side of the normal 904. The first FOV 980 and the second FOV 970 may represent two parts of an image tiled with respect to each other. In some embodiments, the first FOV 980 and the second FOV 970 may butt against each other in the vicinity of the normal 904 (i.e., the gap 990 between the first FOV 980 and the second FOV 970 substantially disappears) to form a combined FOV that represents a continuous image. It may be necessary to make sure that, in the region where the first FOV 980 and the second FOV 970 meet, no ghost images are created.

Figure 10:
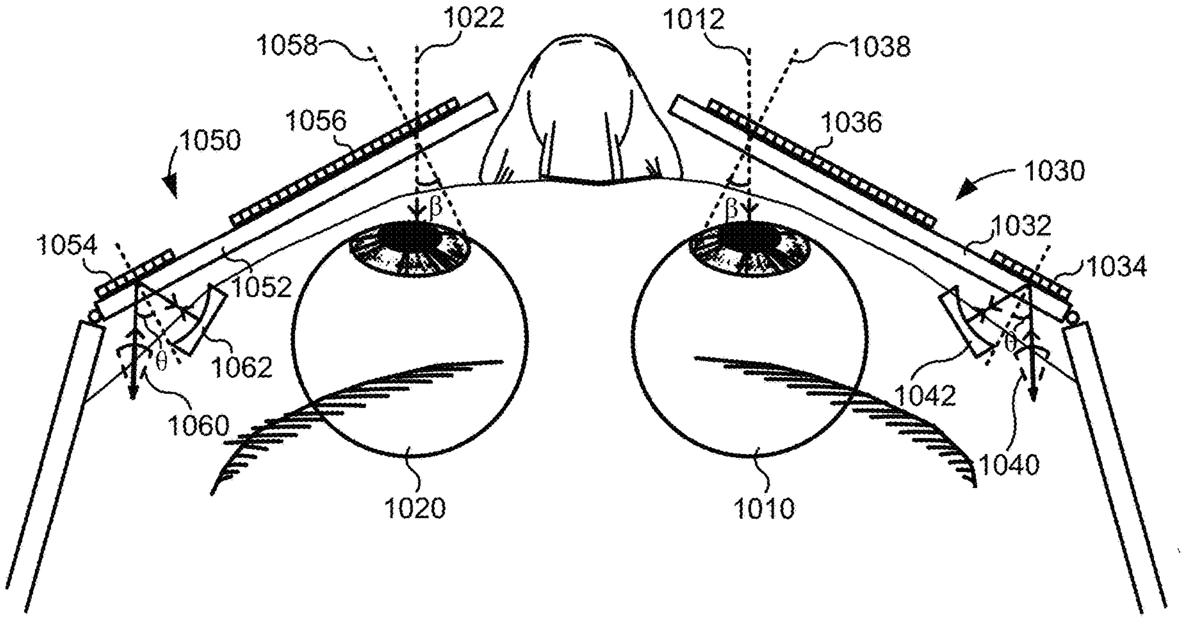
FIG. 10 illustrates schematically a top view of a wearable display according to some embodiments.

FIG. 10 illustrates schematically a top view of a wearable display according to some embodiments. The wearable display includes a first eyepiece 1030 for a right eye 1010 of a viewer, and second eyepiece 1050 for a left eye 1020 of the viewer. The first eyepiece 1030 and the second eyepiece 1050 may be positioned in a goggle that can be worn around a face of the viewer.

The first eyepiece 1030 may include a first planar waveguide 1032, and a first incoupling DOE 1034 and a first outcoupling DOE 1036 coupled to the first waveguide 1032. A first fiber scanning projector may include a first optical fiber 1040 and a first collimating optical element 1042, coupled to the first eyepiece 1030 in an angle-configuration, similar to those illustrated in FIGS. 5A and 5B or FIGS. 7A and 7B. Similarly, the second eyepiece 1050 may include a second planar waveguide 1052, and a second incoupling DOE 1054 and a second outcoupling DOE 1056 coupled to the second waveguide 1052. A second fiber scanning projector may include a second optical fiber 1060 and a second collimating optical element 1062, coupled to the second eyepiece 1050 in an angle-configuration.

It may be preferable to have a finite wrap angle of the eyepieces 1030 and 1050 around the viewers eyes 1010 and 1020, as compared to a straight wrap angle. As illustrated in FIG. 10, the first eyepiece 1030 may be wrapped around the face of the viewer such that there is a finite wrap angle $\beta$ between the normal 1038 of the first waveguide 1032 and a sagittal plane 1012 of the viewer. Similarly, the second eyepiece 1050 may be wrapped around the face of the viewer such that there is a finite wrap angle $\beta$ between the normal 1058 of the second waveguide 1052 and a sagittal plane 1022 of the viewer. (Note that the illustration in FIG. 10 may be somewhat exaggerated.) According to some embodiments, the wrap angle $\beta$ may substantially match the tilting angle θ of the first optical fiber 1040 with respect to the first waveguide 1032, or the tilting angle θ of the second optical fiber 1060 with respect to the second waveguide 1052. As such, the light field projected by each of the first eyepiece 1030 and the second eyepiece 1050 may cover a FOV that includes normal incidence to each respective eye 1010 or 1020. In some other embodiments, the wrap angle β may be less than the tilting angle θ of the optical fiber 1040 or 1060, so as to have a gentler wrap angle. By positioning the first eyepiece 1030 and the second eyepiece 1050 at a finite wrap angle β, the viewer may have a more immersive experience with respect to the virtual content, as compared to a straight wrap angle (e.g., β=0).

Figure 11:
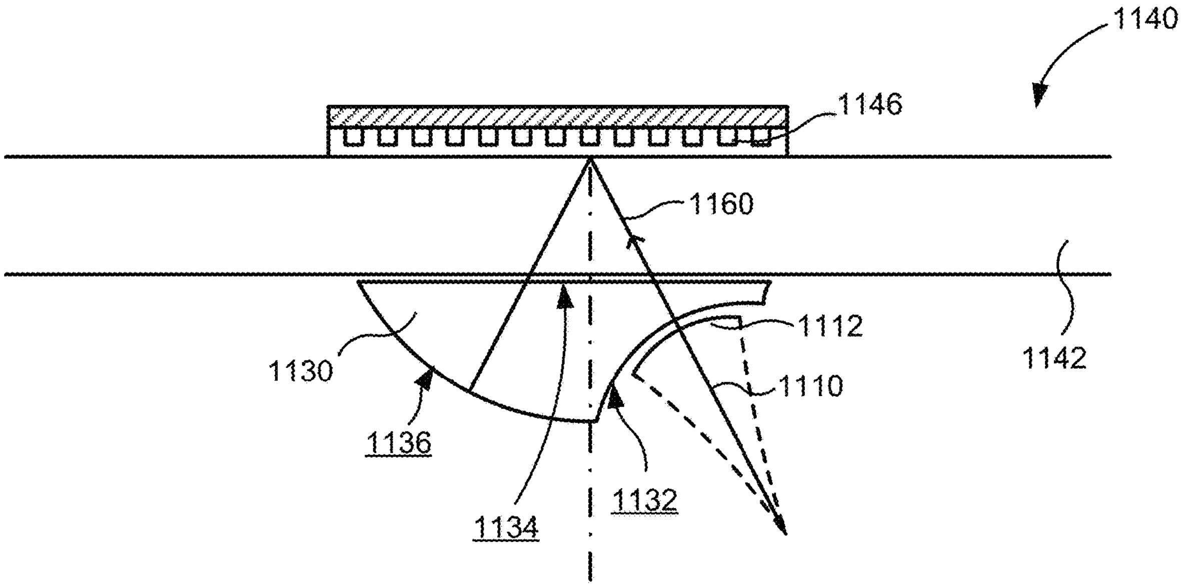
FIG. 11 illustrates schematically a fiber scanning projector coupled to an eyepiece according to some further embodiments.

FIG. 11 illustrates schematically a fiber scanning projector coupled to an eyepiece 1140 according to some further embodiments. The eyepiece 1140 may include a waveguide 1142, and a metallized incoupling DOE 1146 coupled to a lateral region of the waveguide 1142. The fiber scanning projector may include an optical fiber 1110 (or another suitable waveguide scanner). The optical fiber 1110 may be deflected such that the trajectory of its tip defines a two-dimensional convex object surface 1112 (e.g., a part of a spherical surface). The fiber scanning projector may further include a solid "prism" 1130. The prism 1130 may include a first curved surface 1132 that may serve as an input surface for receiving an scanned light beam 1160 emitted from the tip of the optical fiber 1110. The prism 1130 may further include a second surface 1134 that may serve as an output surface for transmitting the scanned light beam 1160. The prism 1130 may further include a third curved surface 1136. The third curved surface 1136 may have a reflective coating, e.g., a metallic coating, and may serve as a collimating mirror, similar to the collimating optical element 530 or 730 as illustrated in FIGS. 5A and 5B and FIGS. 7A and 7B, respectively.

In some embodiments, the first curved surface 1132 may be characterized by an optical power, similar to the polarizing beam splitter described in U.S. patent application Ser. No. 15/927,765. In some other embodiments, the first curved surface 1132 may be part of a spherical surface that substantially matches with the object surface 1112. Thus, the light beam 1160 emitted from the tip of the optical fiber 1110 may normally incident on the first curved surface 1132. The second surface 1134 may also be characterized by an optical power. In some other embodiments, the second surface 1134 may be substantially flat and may make physical contact with the waveguide 1142. The prism 1130 may comprise a material with an index of refraction that substantially matches with the index of refraction of the waveguide 1142, so that light rays exiting the second surface 1134 may not be refracted or may experience negligible refraction. It should be noted that some embodiments utilizing the prism 1130 illustrated in FIG. 11 may benefit from the index of refraction of the prism being greater than one, resulting in the angles at which light refracts in the prism being less than the angles at which light is incident on the prism.

Figure 12:
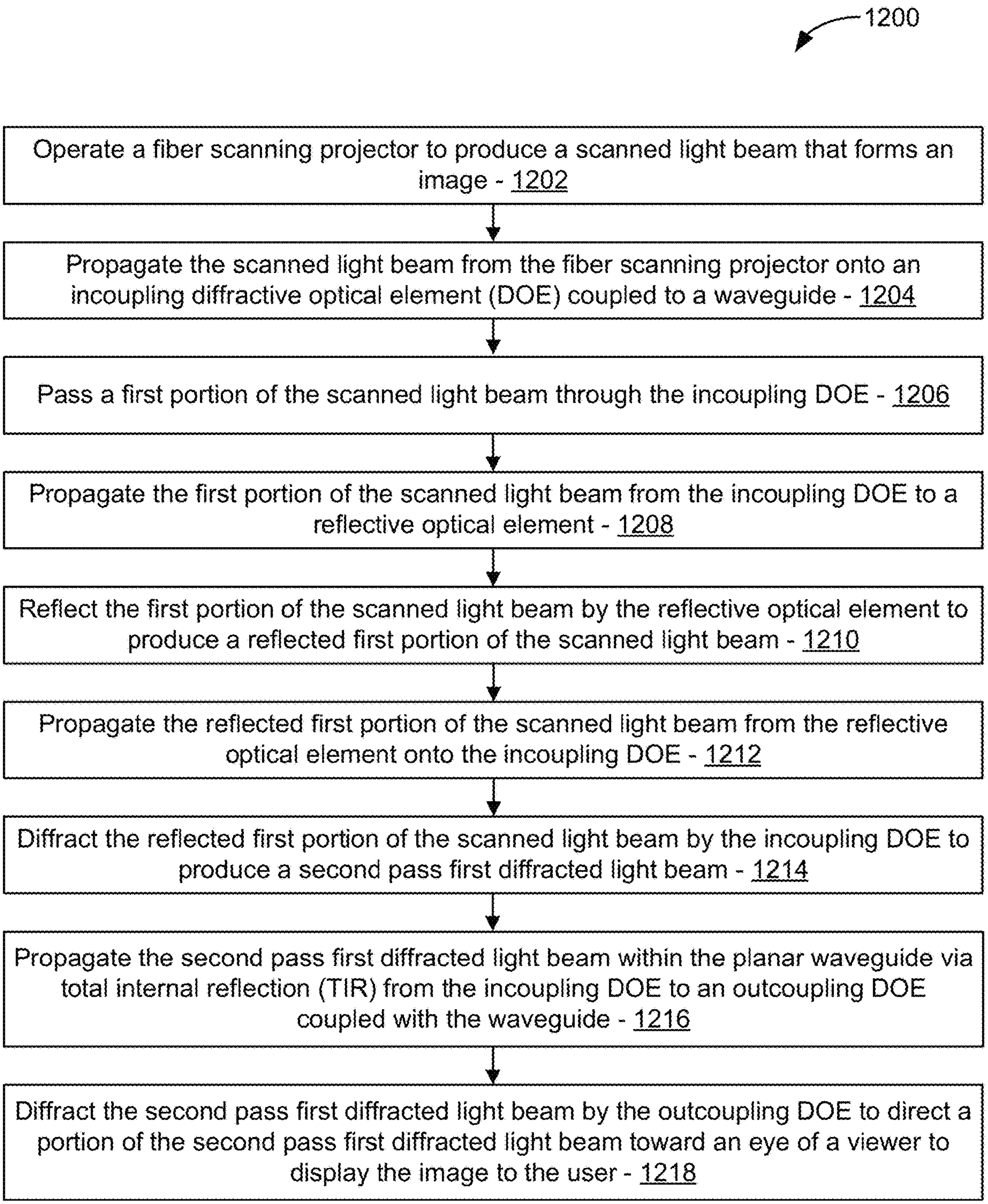
FIG. 12 is a simplified flowchart illustrating a method of displaying an image to a user according to an embodiment of the present invention.

FIG. 12 is a simplified flowchart illustrating a method of displaying an image to a user according to an embodiment of the present invention. Any suitable image display device, such as any suitable image display device of the image display devices described herein, can be used to accomplish the acts of the method 1200. The method 1200 includes operating a fiber scanning projector to produce a scanned light beam that forms an image (1202) and propagating the scanned light beam from the fiber scanning projector onto an incoupling diffractive optical element (DOE) coupled to a waveguide (1204). The method also includes passing a first portion of the scanned light beam through the incoupling DOE (1206) and propagating the first portion of the scanned light beam from the incoupling DOE to a reflective optical element (1208).

The method further includes reflecting the first portion of the scanned light beam by the reflective optical element to produce a reflected first portion of the scanned light beam (1210) and propagating the reflected first portion of the scanned light beam from the reflective optical element onto the incoupling DOE (1212). Furthermore, the method includes diffracting the reflected first portion of the scanned light beam by the incoupling DOE to produce a second pass first diffracted light beam (1214), propagating the second pass first diffracted light beam within the planar waveguide via total internal reflection (TIR) from the incoupling DOE to an outcoupling DOE coupled with the waveguide (1216) and diffracting the second pass first diffracted light beam by the outcoupling DOE to direct a portion of the second pass first diffracted light beam toward an eye of a viewer to display the image to the user (1218).

It should be appreciated that the specific steps illustrated in FIG. 12 provide a particular method of displaying an image to a user according to an embodiment of the present invention. Other sequences of steps may also be performed according to alternative embodiments. For example, alternative embodiments of the present invention may perform the steps outlined above in a different order. Moreover, the individual steps illustrated in FIG. 12 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 13:
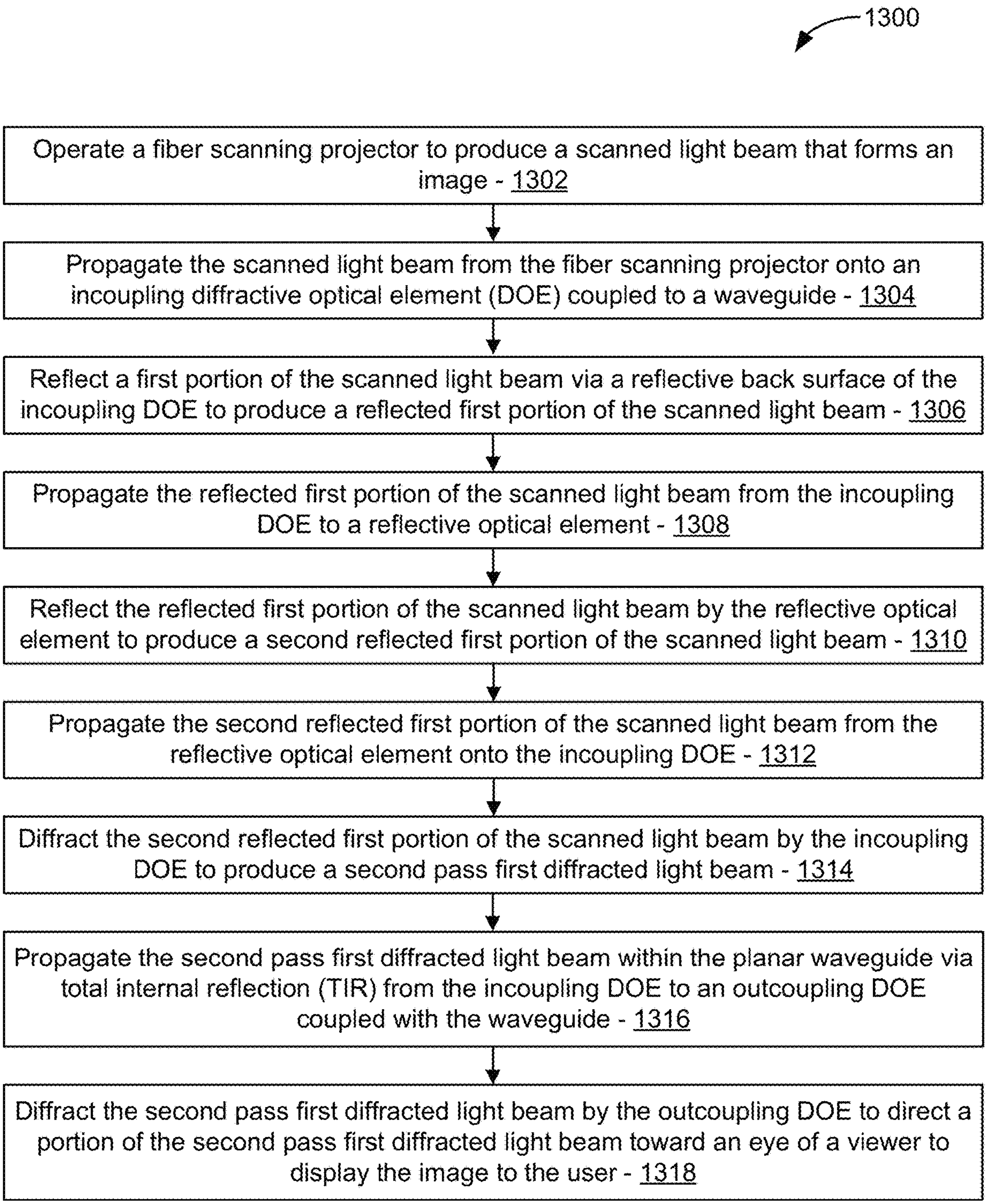
FIG. 13 is a simplified flowchart illustrating a method of displaying an image to a user according to another embodiment of the present invention.

FIG. 13 is a simplified flowchart illustrating a method of displaying an image to a user according to another embodiment of the present invention. Any suitable image display device, such as any suitable image display device of the image display devices described herein, can be used to accomplish the acts of the method 1300. The method 1300 includes operating a fiber scanning projector to produce a scanned light beam that forms an image (1302) and propagating the scanned light beam from the fiber scanning projector onto an incoupling diffractive optical element (DOE) coupled to a waveguide (1304). The method also includes reflecting a first portion of the scanned light beam via a reflective back surface of the incoupling DOE to produce a reflected first portion of the scanned light beam (1306) and propagating the reflected first portion of the scanned light beam is propagated from the incoupling DOE to a reflective optical element (1308).

The method further includes reflecting the reflected first portion of the scanned light beam by the reflective optical element to produce a second reflected first portion of the scanned light beam (1310) and propagating the second reflected first portion of the scanned light beam from the reflective optical element onto the incoupling DOE (1312). Furthermore, the method includes diffracting the second reflected first portion of the scanned light beam by the incoupling DOE to produce a second pass first diffracted light beam (1314), propagating the second pass first diffracted light beam within the planar waveguide via total internal reflection (TIR) from the incoupling DOE to an outcoupling DOE coupled with the waveguide (1316), and diffracting the second pass first diffracted light beam by the outcoupling DOE to direct a portion of the second pass first diffracted light beam toward an eye of a viewer to display the image to the user (1318).

It should be appreciated that the specific steps illustrated in FIG. 13 provide a particular method of displaying an image to a user according to another embodiment of the present invention. Other sequences of steps may also be performed according to alternative embodiments. For example, alternative embodiments of the present invention may perform the steps outlined above in a different order. Moreover, the individual steps illustrated in FIG. 13 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 14:
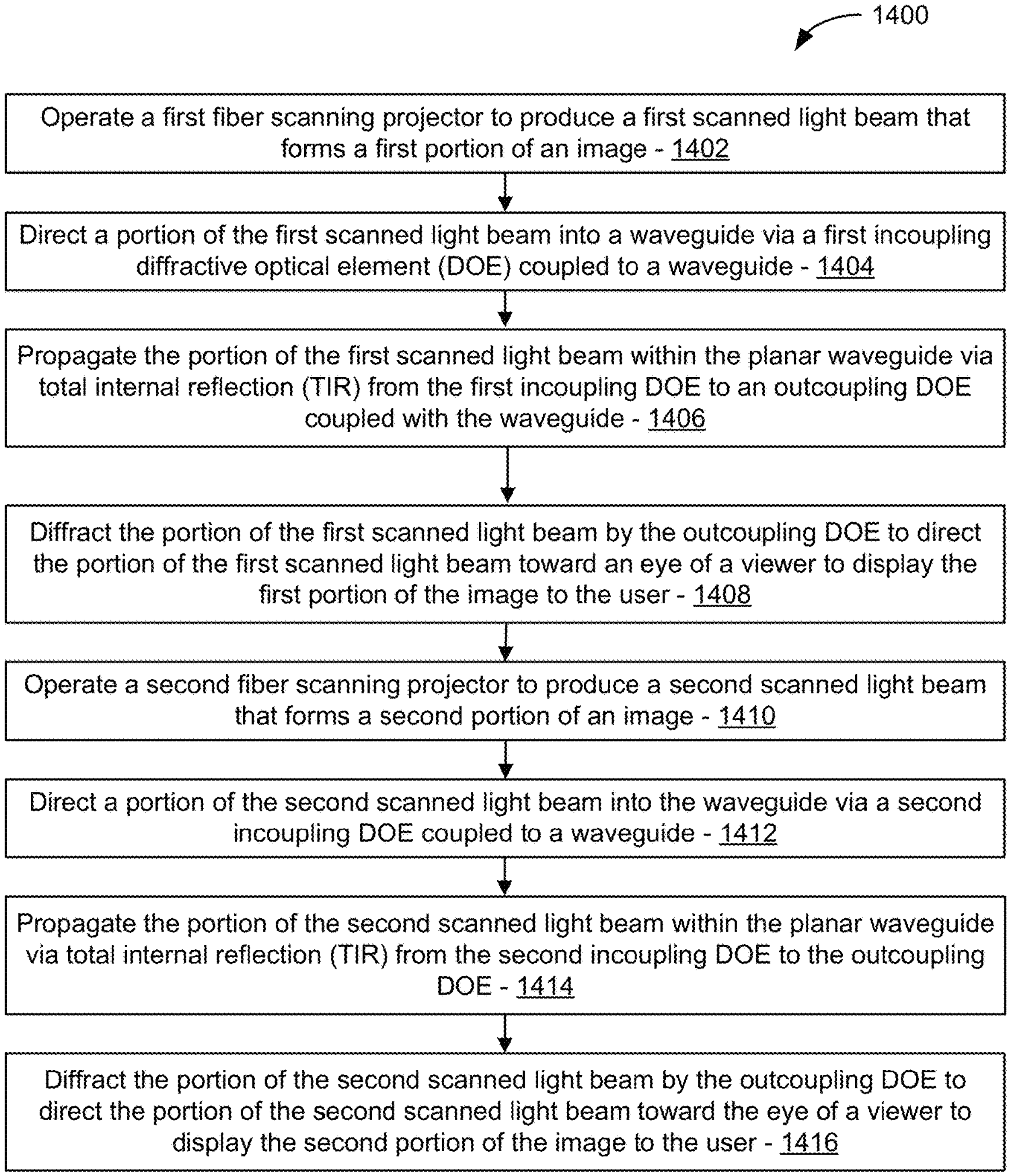
FIG. 14 is a simplified flowchart illustrating a method of displaying an image to a user according to yet another embodiment of the present invention.

FIG. 14 is a simplified flowchart illustrating a method of displaying an image to a user according to yet another embodiment of the present invention. Any suitable image display device, such as any suitable image display device of the image display devices described herein, can be used to accomplish the acts of the method 1400. The method 1400 includes operating a first fiber scanning projector to produce a first scanned light beam that forms a first portion of an image (1402) and directing a portion of the first scanned light beam into a waveguide via a first incoupling diffractive optical element (DOE) coupled to a waveguide (1404). The method also includes propagating the portion of the first scanned light beam within the planar waveguide via total internal reflection (TIR) from the first incoupling DOE to an outcoupling DOE coupled with the waveguide (1406) and diffracting the portion of the first scanned light beam by the outcoupling DOE to direct the portion of the first scanned light beam toward an eye of a viewer to display the first portion of the image to the user (1408).

The method further includes operating a second fiber scanning projector to produce a second scanned light beam that forms a second portion of an image (1410) and directing a portion of the second scanned light beam into the waveguide via a second incoupling DOE coupled to a waveguide (1412). Furthermore, the method includes propagating the portion of the second scanned light beam within the planar waveguide via total internal reflection (TIR) from the second incoupling DOE to the outcoupling DOE (1414) and diffracting the portion of the second scanned light beam by the outcoupling DOE to direct the portion of the second scanned light beam toward the eye of a viewer to display the second portion of the image to the user (1416).

It should be appreciated that the specific steps illustrated in FIG. 14 provide a particular method of displaying an image to a user according to yet another embodiment of the present invention. Other sequences of steps may also be performed according to alternative embodiments. For example, alternative embodiments of the present invention may perform the steps outlined above in a different order. Moreover, the individual steps illustrated in FIG. 14 may include multiple sub-steps that may be performed in various sequences as appropriate to the individual step. Furthermore, additional steps may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A wearable display system comprising:
a fiber scanner including:
an optical fiber; and
a scanning mechanism configured to scan a tip of the optical fiber along an emission trajectory defining an optical axis;
an eyepiece positioned in front of the tip of the optical fiber, the eyepiece including:
a planar waveguide having a first surface facing the tip of the optical fiber and a second surface opposite the first surface, the planar waveguide oriented such that a normal of the planar waveguide is tilted at a first angle with respect to the optical axis;
an incoupling diffractive optical element (DOE) coupled to the second surface of the planar waveguide in a first lateral region that is intercepted by the optical axis, the incoupling DOE comprising a metallized back surface and configured to reflect a first portion of an input light beam emitted from the optical fiber; and
an outcoupling DOE coupled to a second lateral region of the planar waveguide and configured to diffract a portion of light propagating in the planar waveguide out of the planar waveguide toward an eye of a viewer; and
a collimating optical element configured to:
receive the first portion of the input light beam reflected by the incoupling DOE; and
collimate and reflect the first portion of the input light beam toward the eyepiece;
wherein the incoupling DOE is further configured to diffract a first fraction of the first portion of the input light beam.

2. The wearable display system of claim 1 wherein the first portion of the input light beam is reflected by the incoupling DOE as a zeroth order reflection.

3. The wearable display system of claim 2 wherein the first fraction of the first portion of the input light beam is diffracted by the incoupling DOE as a negative first order diffraction.

4. The wearable display system of claim 1 wherein the incoupling DOE diffracts the first fraction of the first portion of the input light beam to form and direct a first pass first diffracted light beam into the planar waveguide that fails to propagate within the planar waveguide via total internal reflection.

5. The wearable display system of claim 4 wherein the first pass first diffracted light beam comprises a positive first order diffraction.

6. The wearable display system of claim 1 wherein the incoupling DOE diffracts the first fraction of the first portion of the input light beam to form and direct a first pass second diffracted light beam into the planar waveguide that propagates within the planar waveguide via total internal reflection.

7. The wearable display system of claim 6 wherein the first pass second diffracted light beam comprises a negative first order diffraction.

8. The wearable display system of claim 1 wherein the incoupling DOE diffracts the first fraction of the first portion of the input light beam to form and direct a second pass second diffracted light beam into the planar waveguide that fails to propagate within the planar waveguide via total internal reflection.

9. The wearable display system of claim 8 wherein the second pass second diffracted light beam comprises a positive first order diffraction.

10. The wearable display system of claim 1 wherein the collimating optical element comprises a concave mirror.

11. The wearable display system of claim 1 wherein the tip of the optical fiber is positioned on a first side of the eyepiece and the collimating optical element is positioned on the first side of the eyepiece.

12. The wearable display system of claim 1 wherein the emission trajectory of the tip of the optical fiber forms a two-dimensional convex surface.

13. The wearable display system of claim 1 wherein the emission trajectory of the tip of the optical fiber forms a one-dimensional arc.

14. The wearable display system of claim 1 wherein the tip of the optical fiber comprises an angled facet.

15. The wearable display system of claim 1 wherein the input light beam is imagewise modulated.

16. The wearable display system of claim 1 wherein the optical fiber comprises a non-polarization-maintaining optical fiber and the input light beam is unpolarized.

17. The wearable display system of claim 1 wherein the first angle comprises an oblique angle.

* * * * *